US009335764B2

(12) United States Patent
Herz et al.

(10) Patent No.: US 9,335,764 B2
(45) Date of Patent: May 10, 2016

(54) VIRTUAL AND AUGMENTED REALITY COCKPIT AND OPERATIONAL CONTROL SYSTEMS

(71) Applicant: Recreational Drone Event Systems, LLC, Ashburn, VA (US)

(72) Inventors: Steven D. Herz, Ashburn, VA (US); Alfred N. Kovalik, North Branford, CT (US)

(73) Assignee: Recreational Drone Event Systems, LLC, Ashburn, VA (US)

( * ) Notice: Subject to any disclaimer, the term of this patent is extended or adjusted under 35 U.S.C. 154(b) by 0 days.

(21) Appl. No.: 14/721,268

(22) Filed: May 26, 2015

(65) Prior Publication Data
US 2015/0346722 A1 Dec. 3, 2015

Related U.S. Application Data

(60) Provisional application No. 62/003,107, filed on May 27, 2014.

(51) Int. Cl.
G05D 3/00 (2006.01)
G05D 1/00 (2006.01)
G01S 19/13 (2010.01)

(52) U.S. Cl.
CPC .............. G05D 1/0038 (2013.01); G01S 19/13 (2013.01); G05D 1/0027 (2013.01)

(58) Field of Classification Search
USPC .......................................................... 701/2
See application file for complete search history.

(56) References Cited

U.S. PATENT DOCUMENTS

| 7,920,071 | B2 | 4/2011 | Baillot |
| 8,301,318 | B2 | 10/2012 | Lacaze et al. |
| 8,326,469 | B2 | 12/2012 | Phillips et al. |
| 8,475,275 | B2 | 7/2013 | Weston et al. |
| 8,577,535 | B2 | 11/2013 | Cummings et al. |

(Continued)

FOREIGN PATENT DOCUMENTS

WO 2013163746 A1 11/2013

OTHER PUBLICATIONS

PCT/US15/32585, International Search Report, Mailed Feb. 2, 2016.

*Primary Examiner* — Muhammad Shafi
(74) *Attorney, Agent, or Firm* — Wiggin and Dana LLP; Gregory S. Rosenblatt

(57) ABSTRACT

Architecture for a multimodal, multiplatform switching, unmanned vehicle (UV) swarm system which can execute missions in diverse environments. The architecture includes onboard and ground processors to handle and integrate multiple sensor inputs generating a unique UV pilot experience for a remote drone pilot (RDP) via a virtual augmented reality cockpit (VARC). The RDP is monitored by an operational control system and an experienced control pilot. A ground processor handles real-time localization, forwarding of commands, generation and delivery of augmented content to users, along with safety features and overrides. The UVs onboard processors and autopilot execute the commands and provide a redundant source of safety features and override in the case of loss of signal. The UVs perform customizable missions, with adjustable rules for differing skill levels. RDPs experience real-time virtual piloting of the UV with augmented interactive and actionable visual and audio content delivered to them via VARC systems.

21 Claims, 18 Drawing Sheets

EXAMPLE ARCHITECTURE FOR THE EXAMPLE PARDE SYSTEM, IN ACCORDANCE WITH EMBODIMENTS OF THE INVENTION

(56) References Cited

U.S. PATENT DOCUMENTS

| | | |
|---|---|---|
| 8,626,361 B2 | 1/2014 | Gerlock |
| 8,768,555 B2 | 7/2014 | Duggan et al. |
| 2003/0227395 A1 | 12/2003 | Zeineh |
| 2004/0193334 A1 | 9/2004 | Carlsson et al. |
| 2006/0095249 A1 | 5/2006 | Kong et al. |
| 2007/0219831 A1 | 9/2007 | Ne'meth |
| 2009/0222149 A1 | 9/2009 | Murray et al. |
| 2011/0130913 A1 | 6/2011 | Duggan et al. |
| 2012/0162253 A1 | 6/2012 | Collins |
| 2014/0063054 A1* | 3/2014 | Osterhout ............... G06F 3/005 345/663 |
| 2014/0249693 A1* | 9/2014 | Stark .................... B64C 39/024 701/2 |

\* cited by examiner

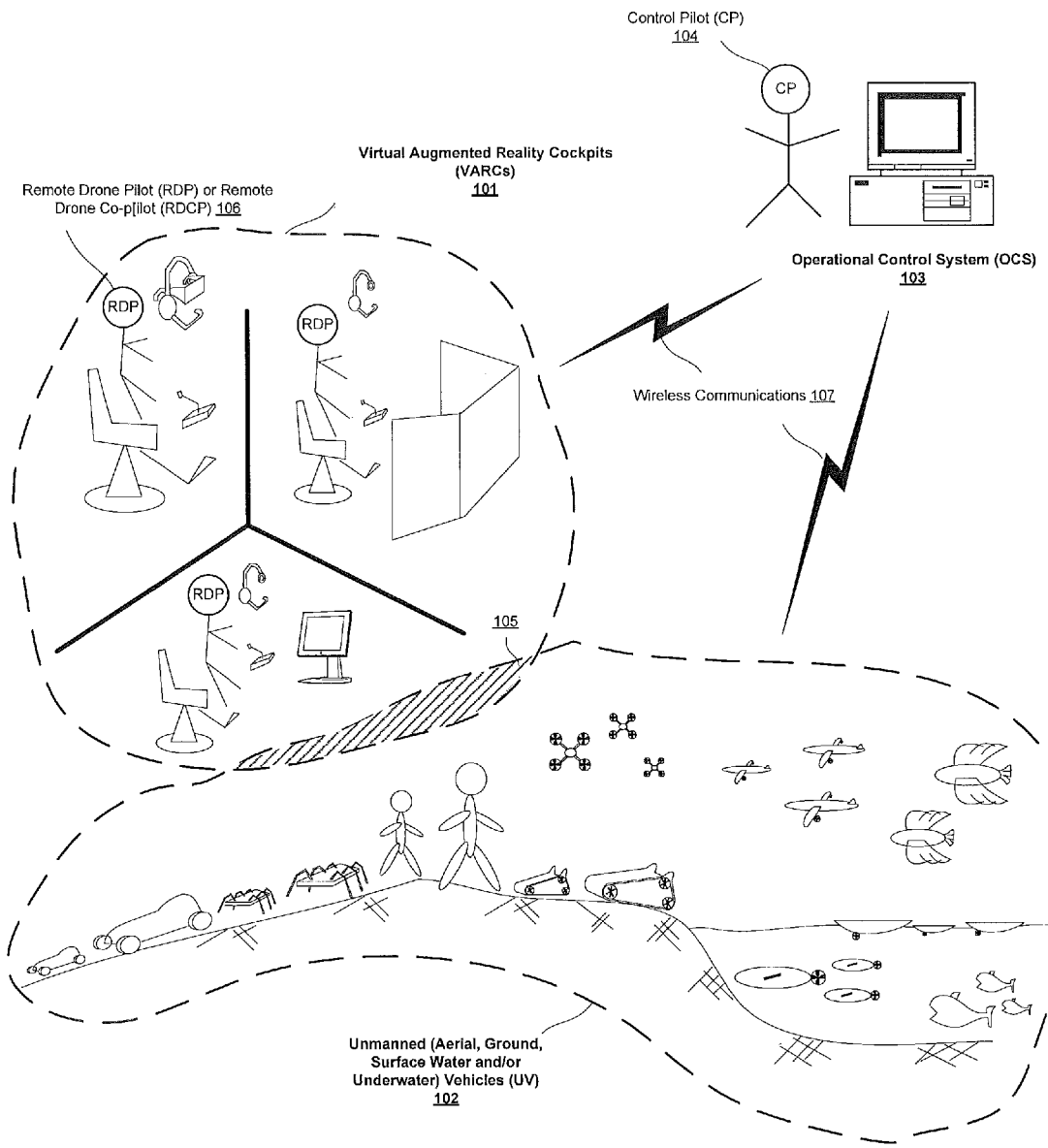
FIG. 1 – EXAMPLE PERSONALIZED AUGMENTED REALITY DRONE EVENT (PARDE) SYSTEM, IN ACCORDANCE WITH EMBODIMENTS OF THE INVENTION

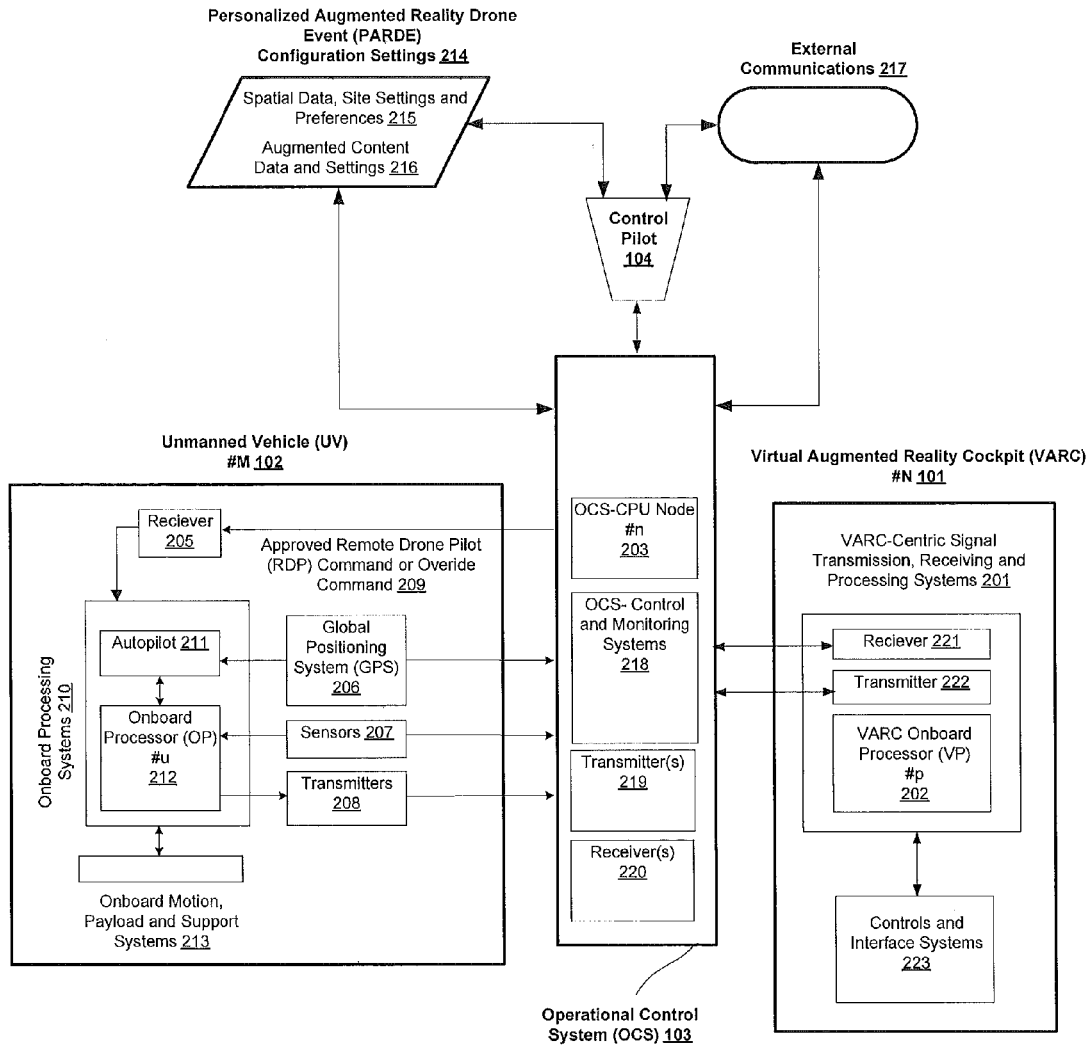
FIG. 2 – EXAMPLE ARCHITECTURE FOR THE EXAMPLE PARDE SYSTEM, IN ACCORDANCEE WITH EMBODIMENTS OF THE INVENTION

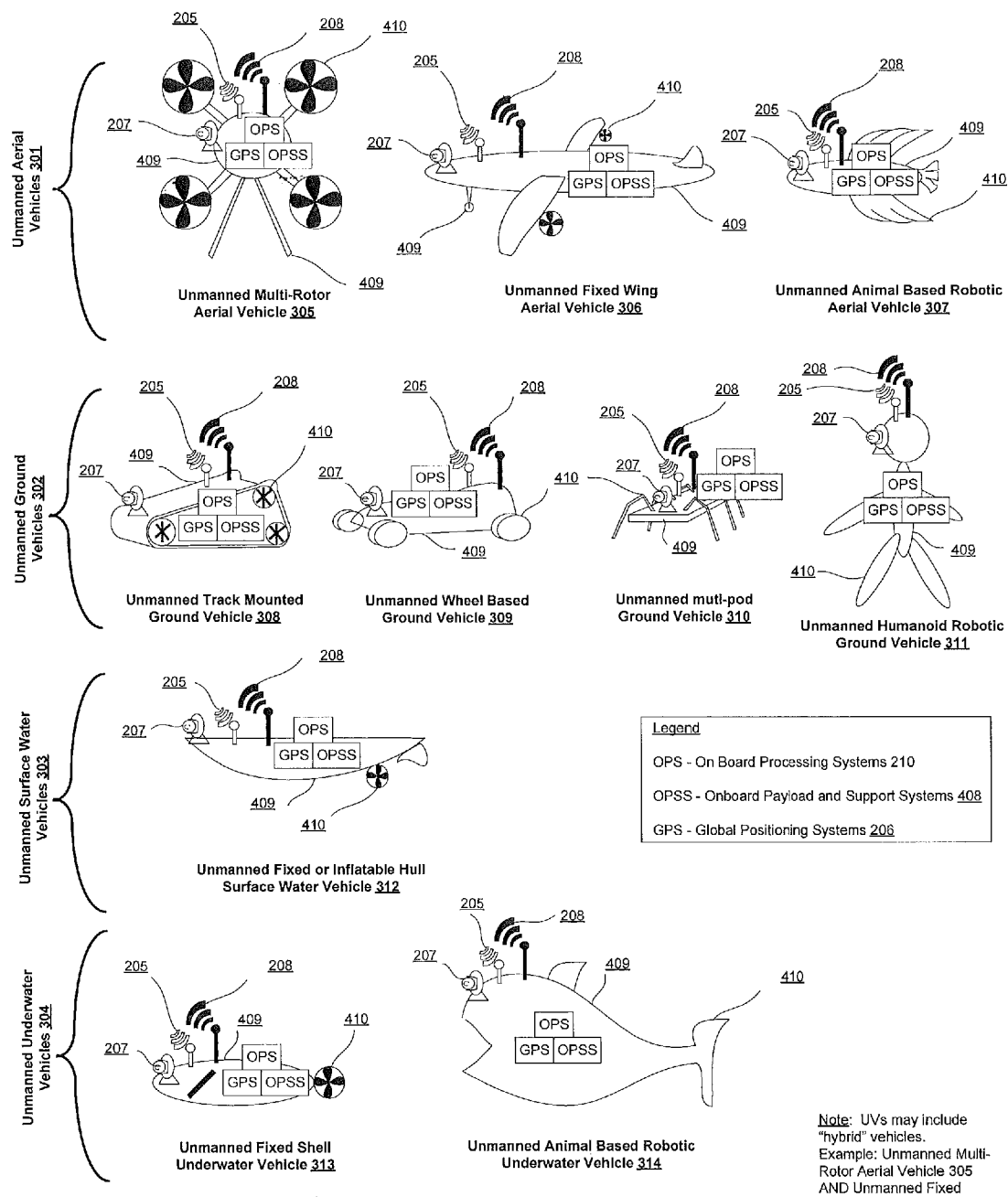
FIG. 3 – EXAMPLE UNMANNED VEHICLES (UV) 102, IN ACCORDANCE WITH EMBODIMENTS OF THE INVENTION

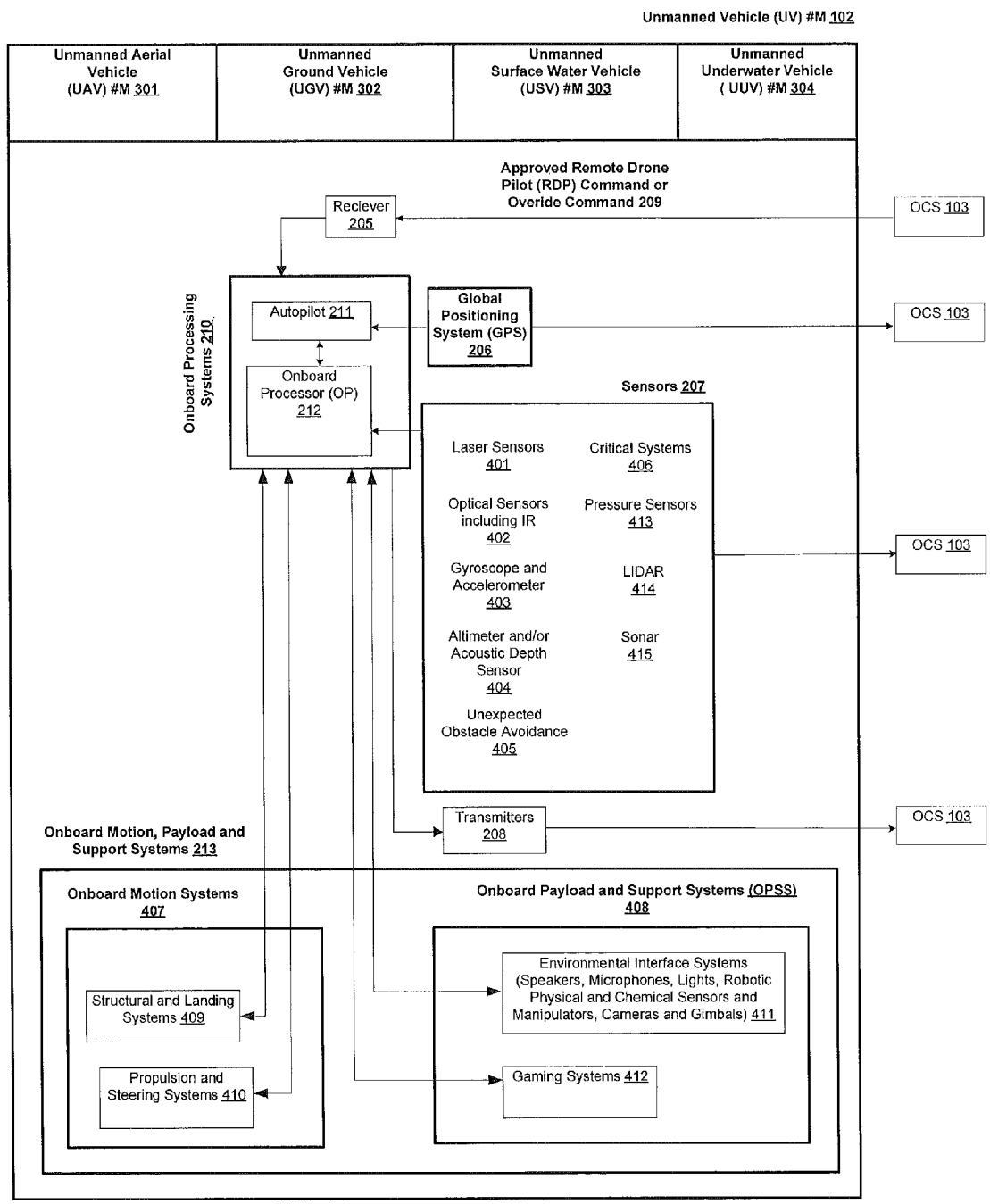
FIG. 4 – EXAMPLE UNMANNED VEHICLE 102 ARCHITECTURE, IN ACCORDANCE WITH EMBODIMENTS OF THE INVENTION

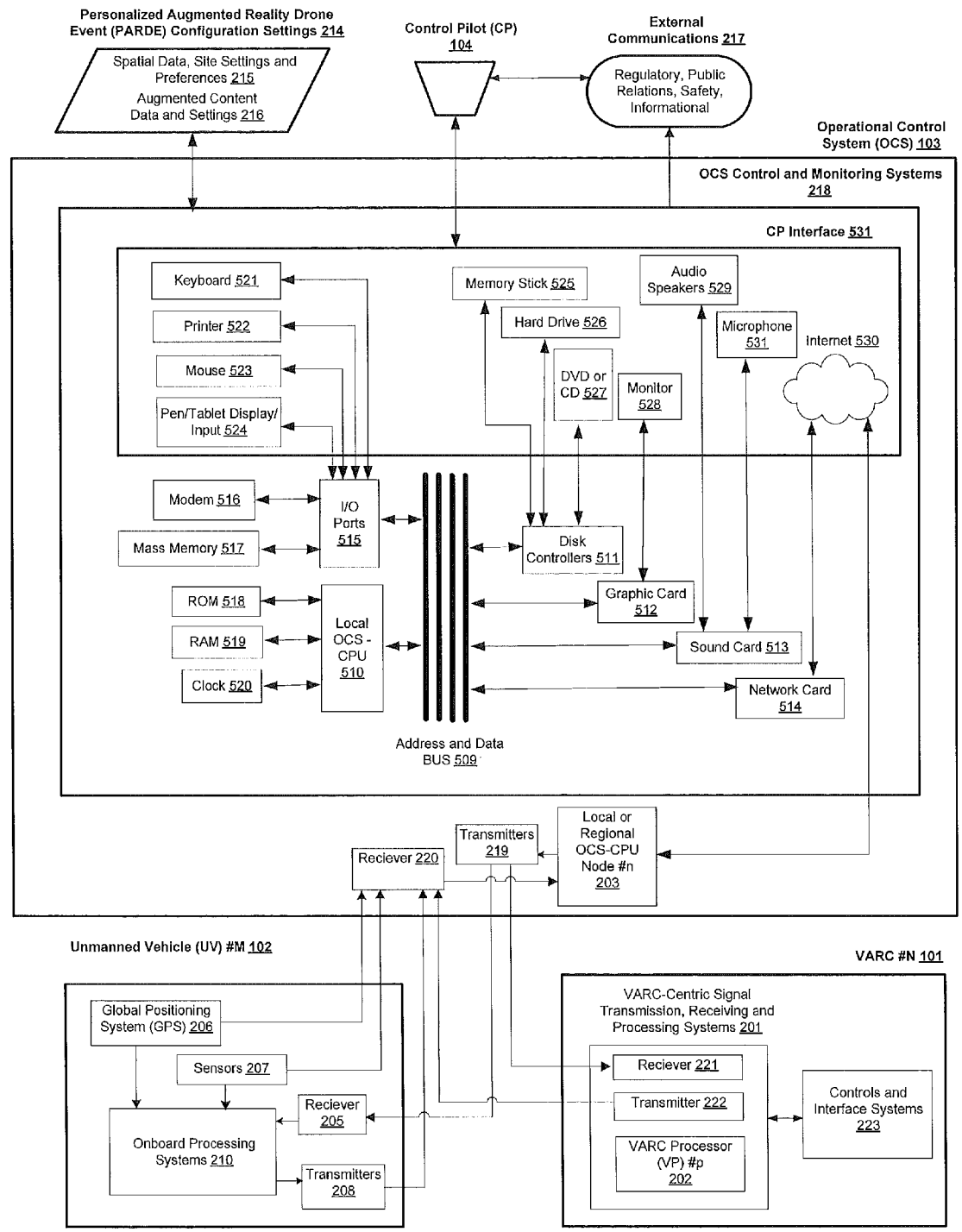
FIG. 5 - EXAMPLE OPERATIONAL CONTROL SYSTEM (OCS) 103
ARCHITECTURE, IN ACCORDANCE WITH EMBODIMENTS OF THE INVENTION

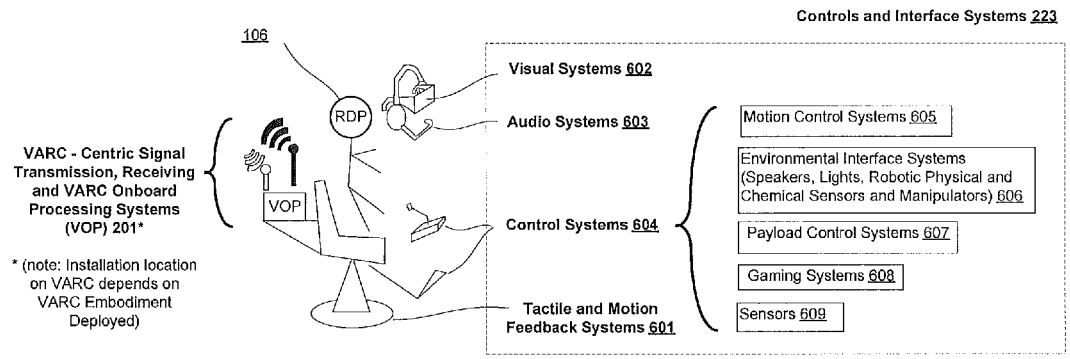

FIG. 6 – EXAMPLE VIRTUAL AUGMENTED REALITY COCKPIT (VARC) 101 IN ACCORDANCE WITH EMBODIMENTS OF THE INVENTION

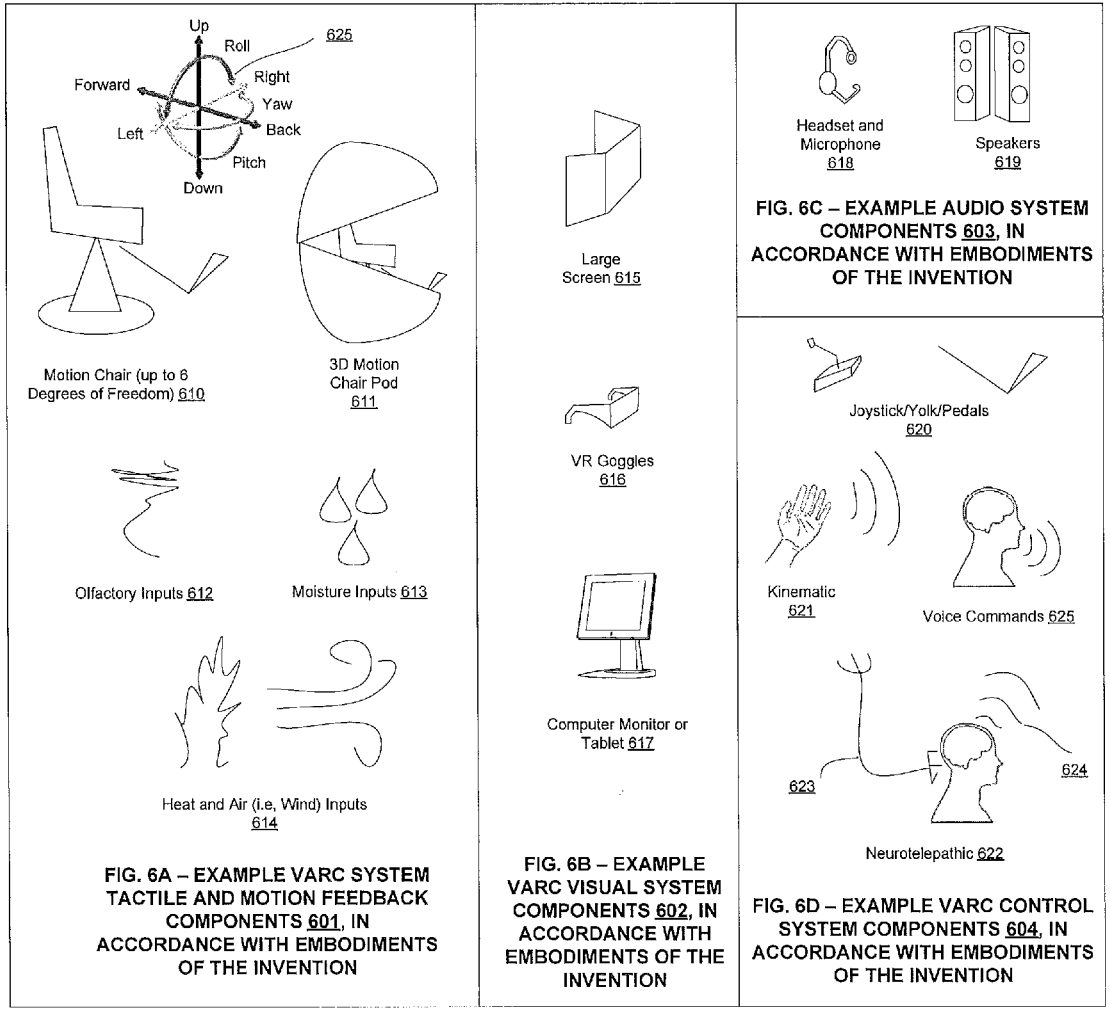

FIG. 6A – EXAMPLE VARC SYSTEM TACTILE AND MOTION FEEDBACK COMPONENTS 601, IN ACCORDANCE WITH EMBODIMENTS OF THE INVENTION

FIG. 6B – EXAMPLE VARC VISUAL SYSTEM COMPONENTS 602, IN ACCORDANCE WITH EMBODIMENTS OF THE INVENTION

FIG. 6C – EXAMPLE AUDIO SYSTEM COMPONENTS 603, IN ACCORDANCE WITH EMBODIMENTS OF THE INVENTION

FIG. 6D – EXAMPLE VARC CONTROL SYSTEM COMPONENTS 604, IN ACCORDANCE WITH EMBODIMENTS OF THE INVENTION

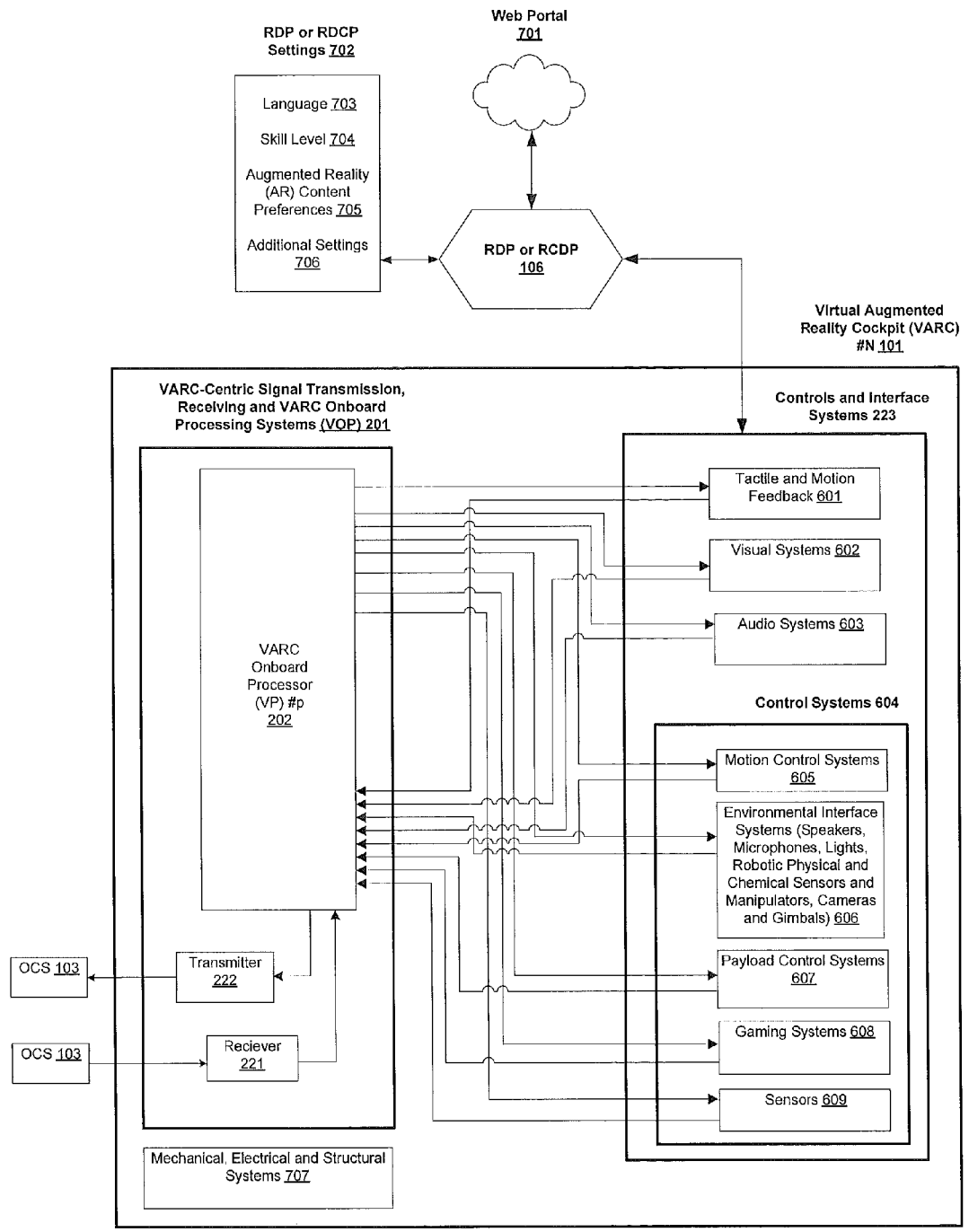
FIG. 7 - EXAMPLE VARC 101, ARCHITECTURE IN ACCORDANCE WITH THE EMBODIMENTS OF THE INVENTION

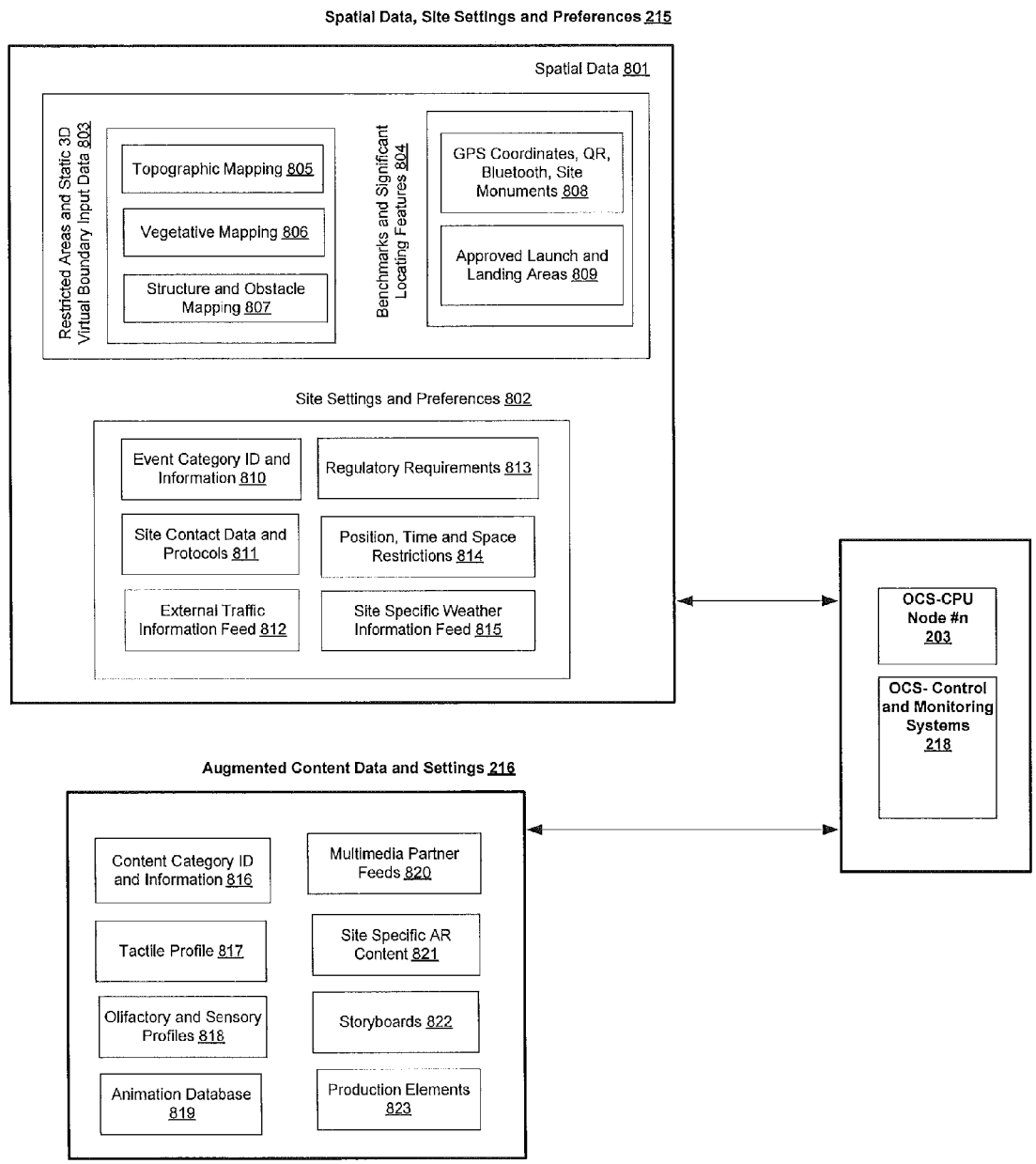
FIG. 8 - EXAMPLE PERSONALIZED AUGMENTED REALITY DRONE EVENT (PARDE) DATA AND SETTINGS 214 ARCHITECTURE

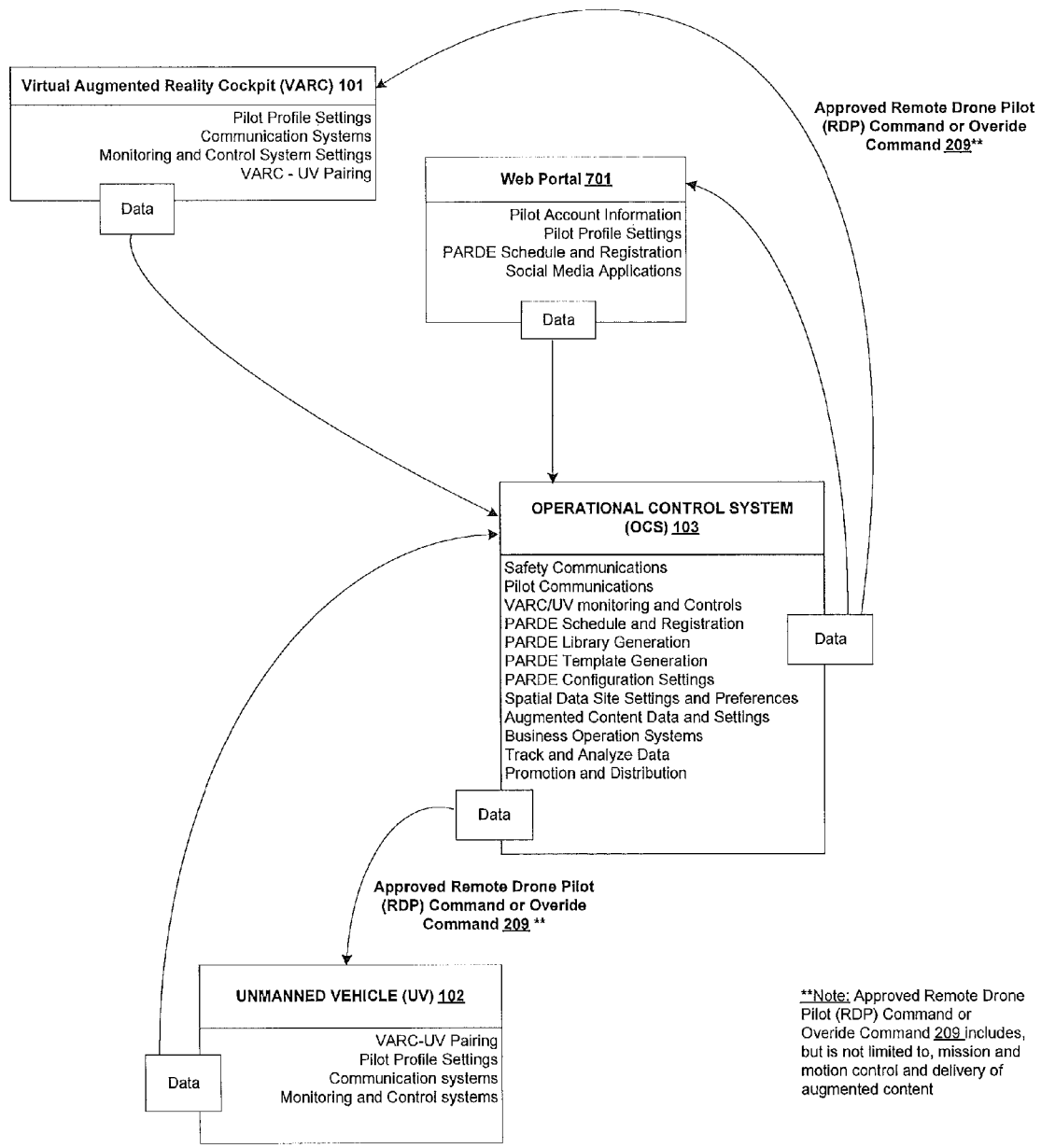
FIG. 9 - EXAMPLE Hierarchic Object-Oriented Design (HOOD) PERSONALIZED AUGMENTED REALITY DRONE EVENT (PARDE) OPERATING SYSTEM SOFTWARE 901

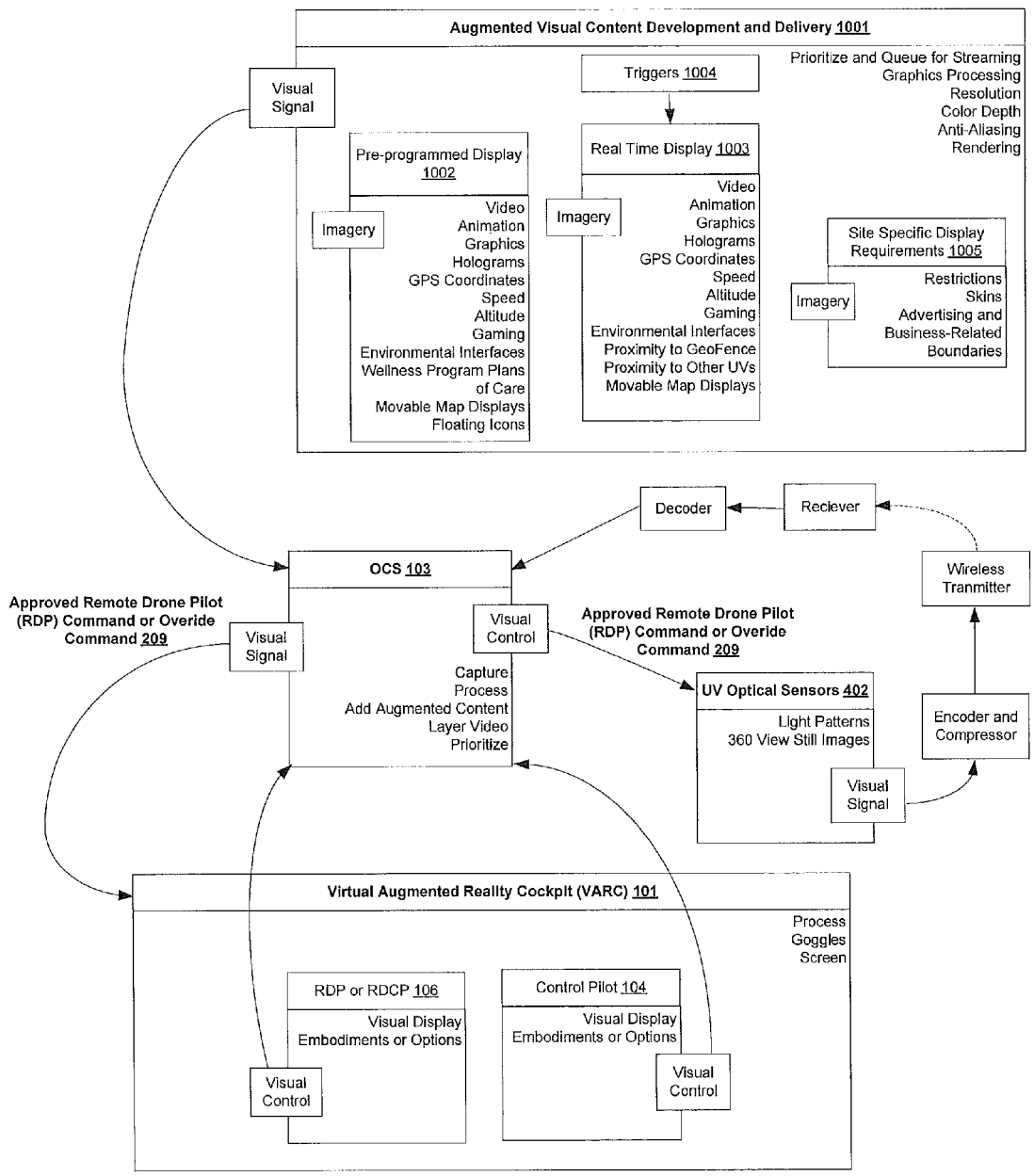
FIG. 10 - EXAMPLE Hierarchic Object-Oriented Design (HOOD) PERSONALIZED AUGMENTED REALITY DRONE EVENT (PARDE) VISUAL DATA AND SETTINGS

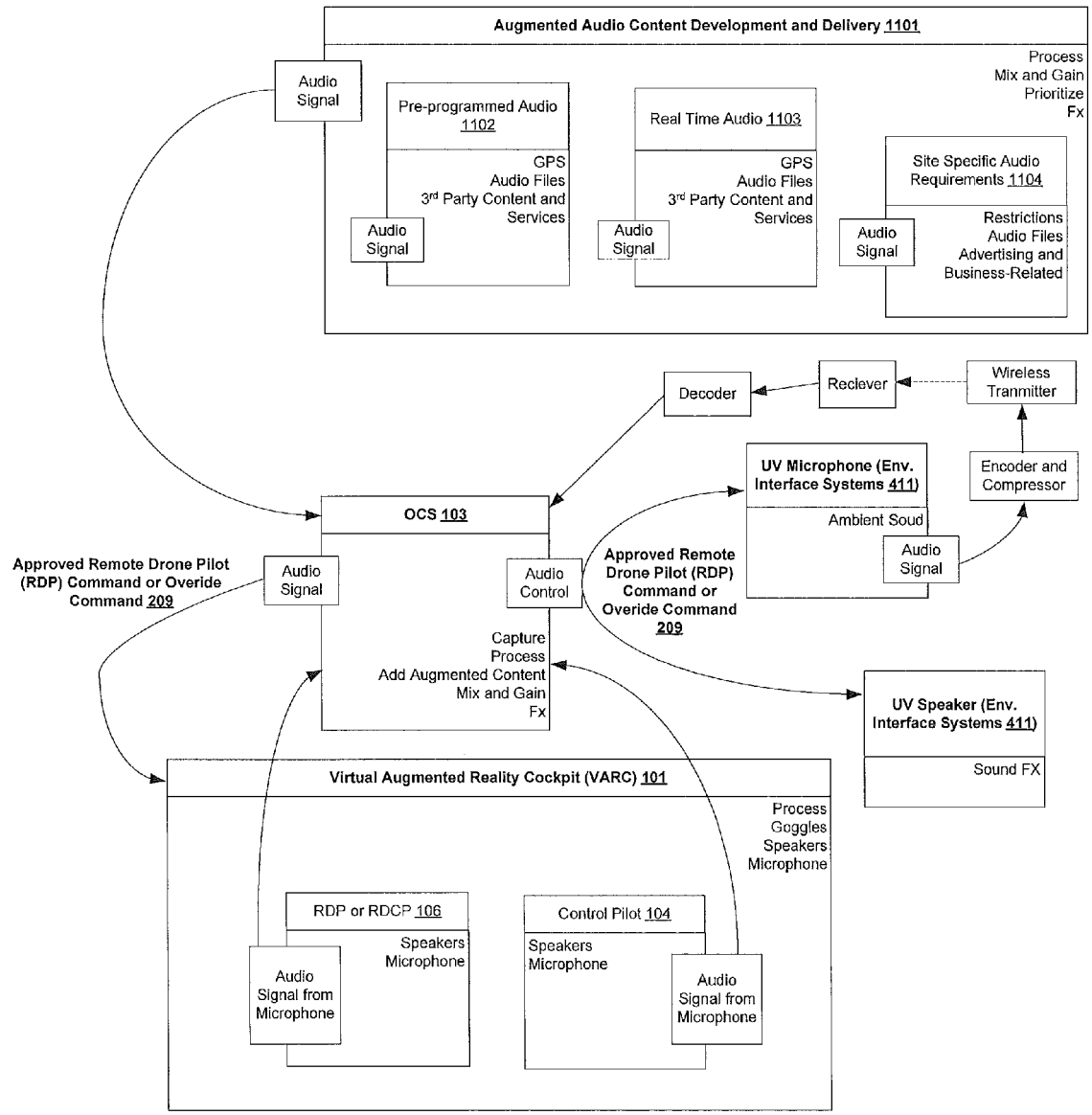
FIG. 11 - EXAMPLE Hierarchic Object-Oriented Design (HOOD)
PERSONALIZED AUGMENTED REALITY DRONE EVENT
(PARDE) AUDIO DATA AND SETTINGS

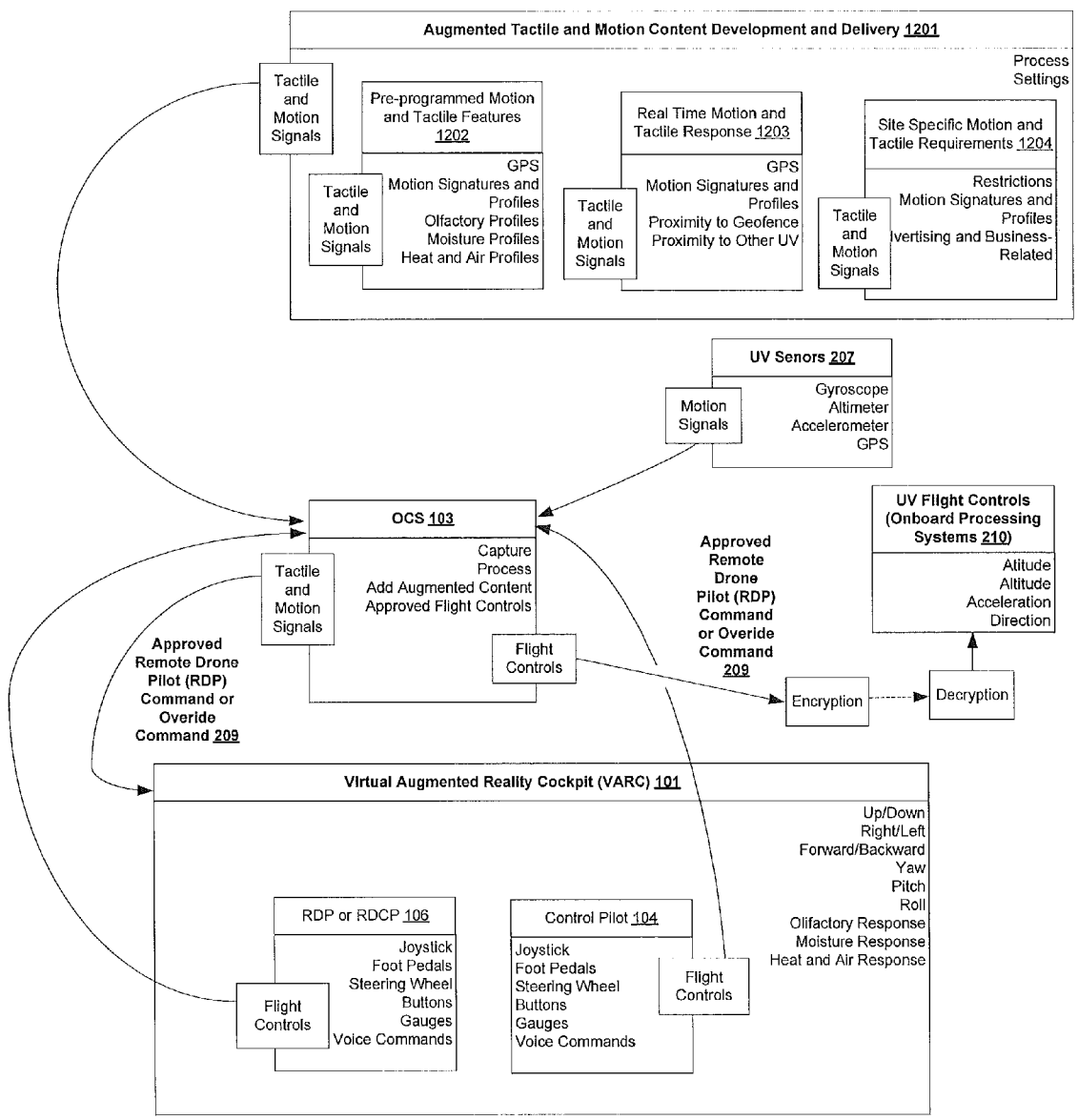
FIG. 12 - EXAMPLE Hierarchic Object-Oriented Design (HOOD) PERSONALIZED AUGMENTED REALITY DRONE EVENT (PARDE) <u>TACTILE AND MOTION</u> DATA AND SETTINGS

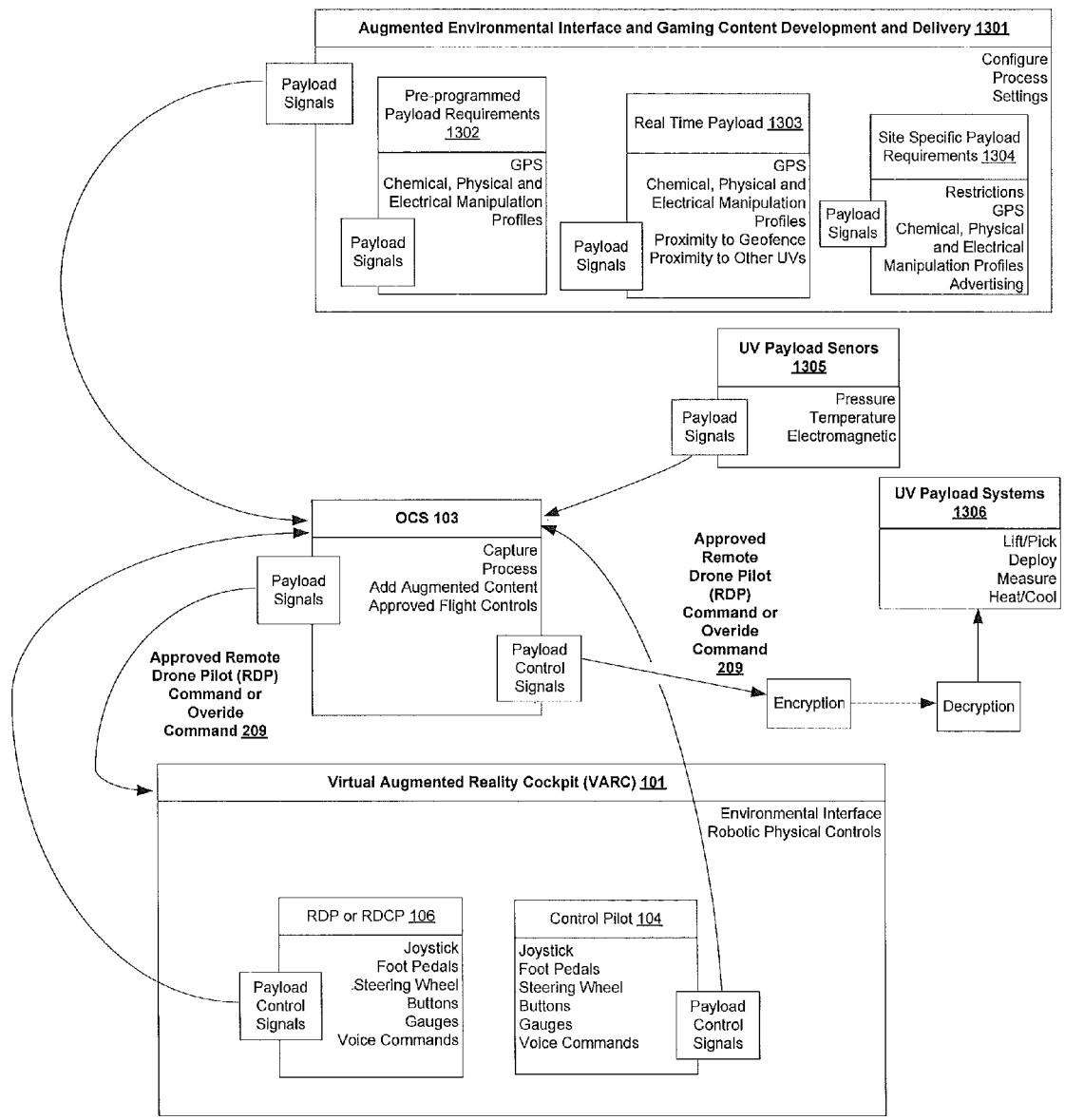
FIG. 13 - EXAMPLE Hierarchic Object-Oriented Design (HOOD) PERSONALIZED AUGMENTED REALITY DRONE EVENT (PARDE) <u>ENVIRONMENTAL INTERFACE, PAYLOAD CONTROL AND GAMING SYSTEMS (PAYLOAD)</u> DATA AND SETTINGS

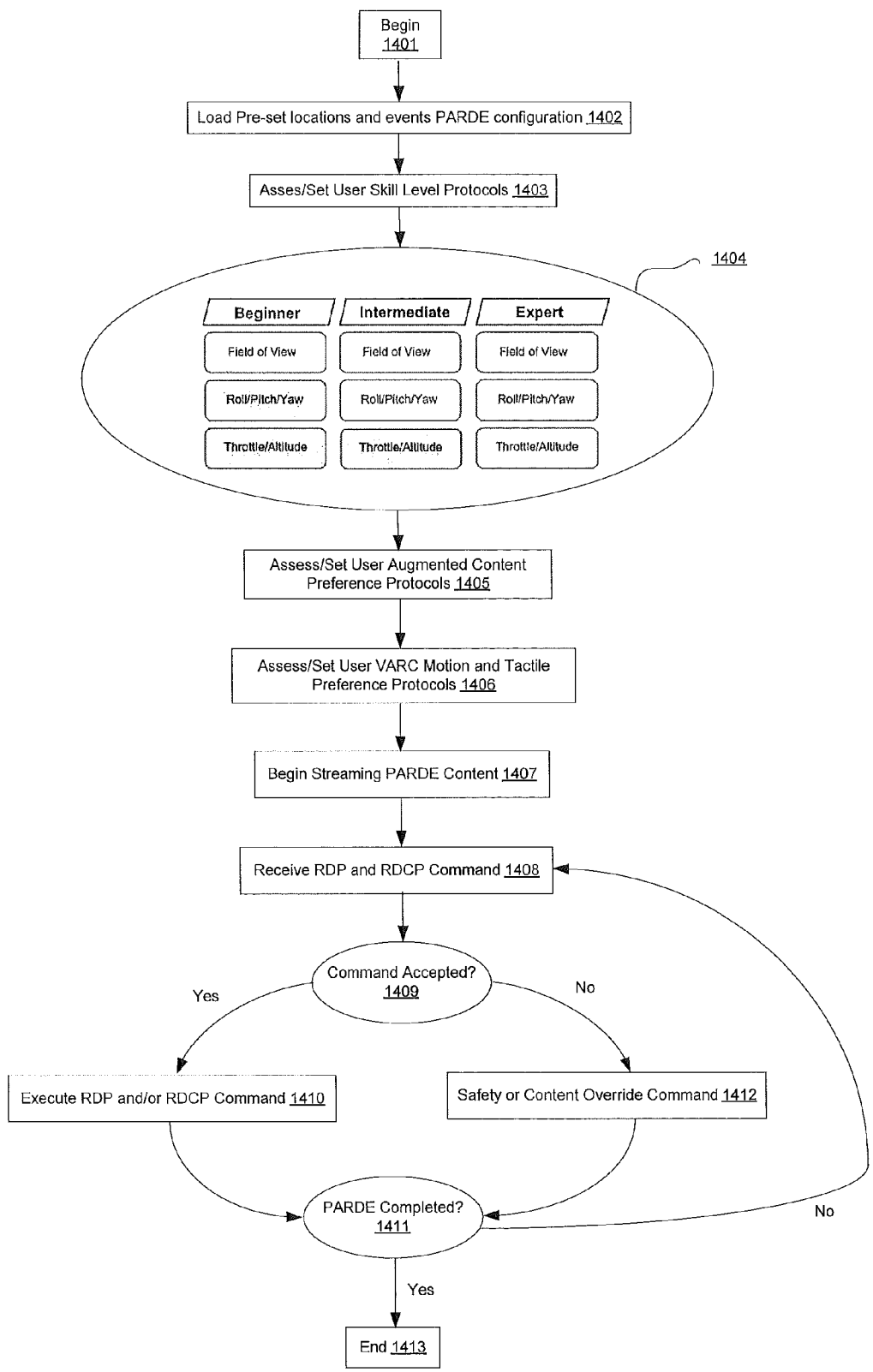
FIG. 14 - EXAMPLE PERSONALIZED AUGMENTED REALITY DRONE EVENT (PARDE) RUN FLOWCHART

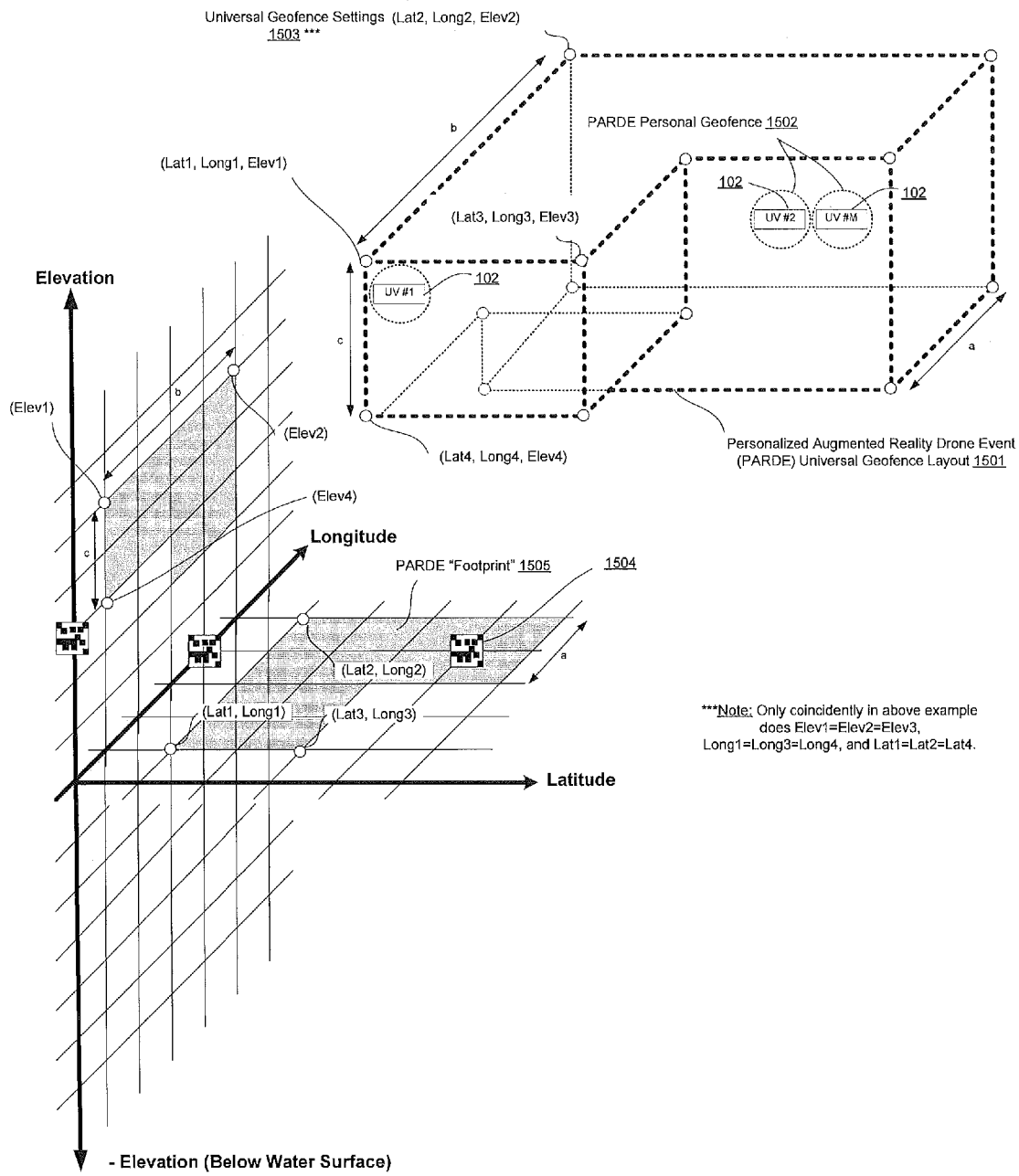
FIG. 15 - EXAMPLE PARDE UNIVERSAL AND PERSONAL GEO-FENCING, IN ACCORDANCE WITH EMBODIMENTS OF THE INVENTION

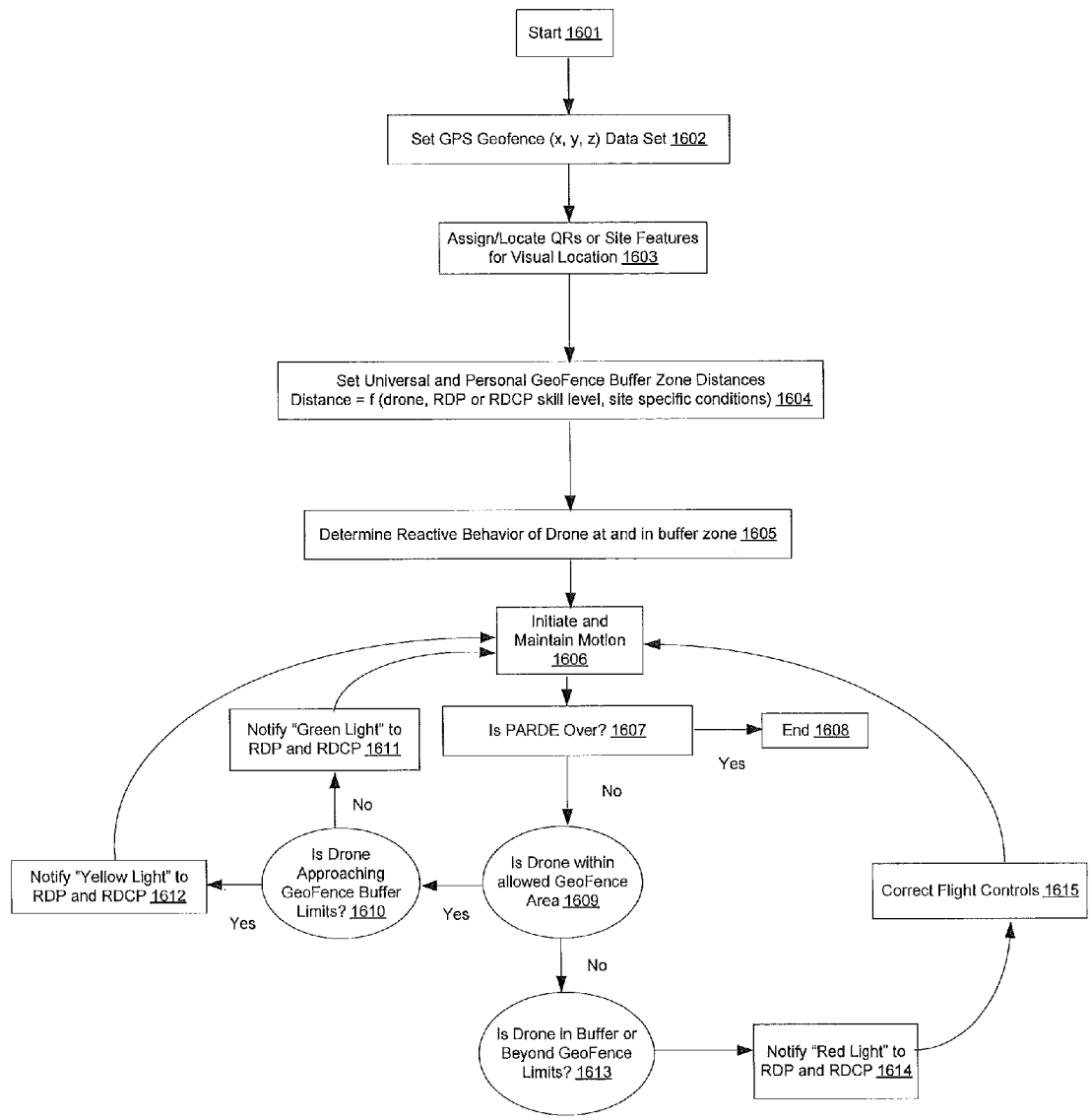
FIG. 16 - UNIVERSAL GEOFENCE LOGIC FLOWCHART

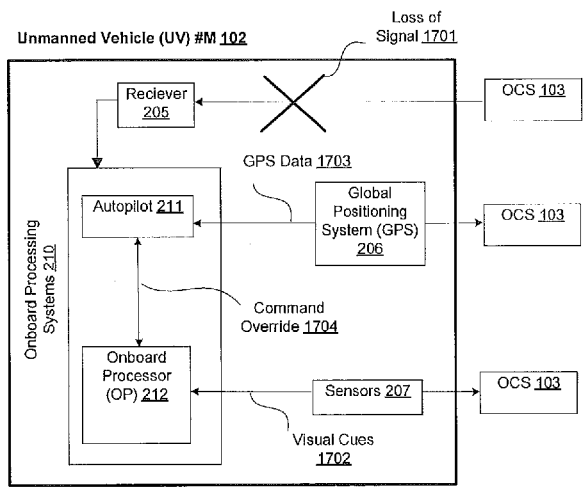
FIG. 17A - EXAMPLE ARCHITECTURE IN THE EVENT OF SIGNAL LOSS to UV RECEIVER
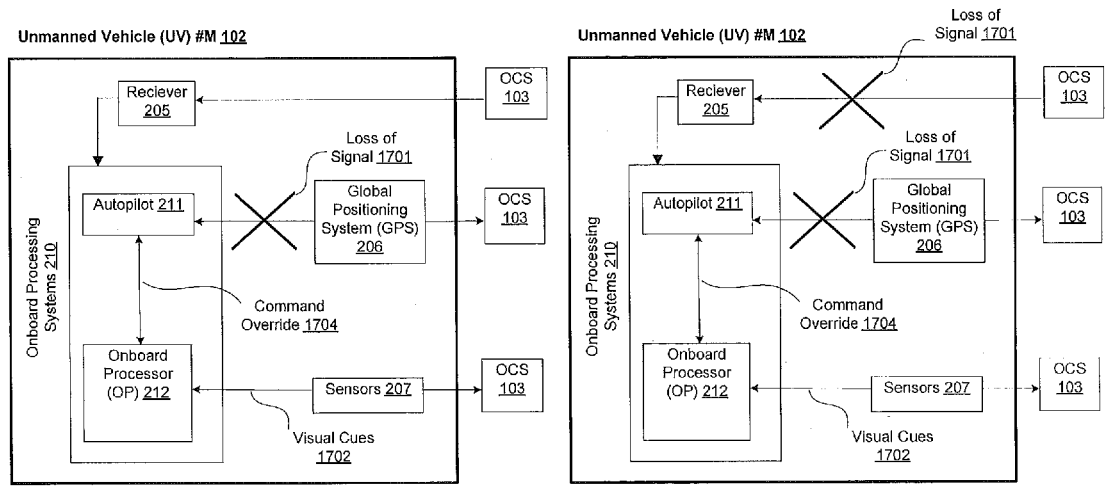
FIG. 17B - EXAMPLE ARCHITECTURE IN THE EVENT OF LOSS OF GPS SIGNAL
FIG. 17C - EXAMPLE ARCHITECTURE IN THE EVENT OF SIGNAL LOSS to UV RECEIVER and LOSS OF GPS SIGNAL

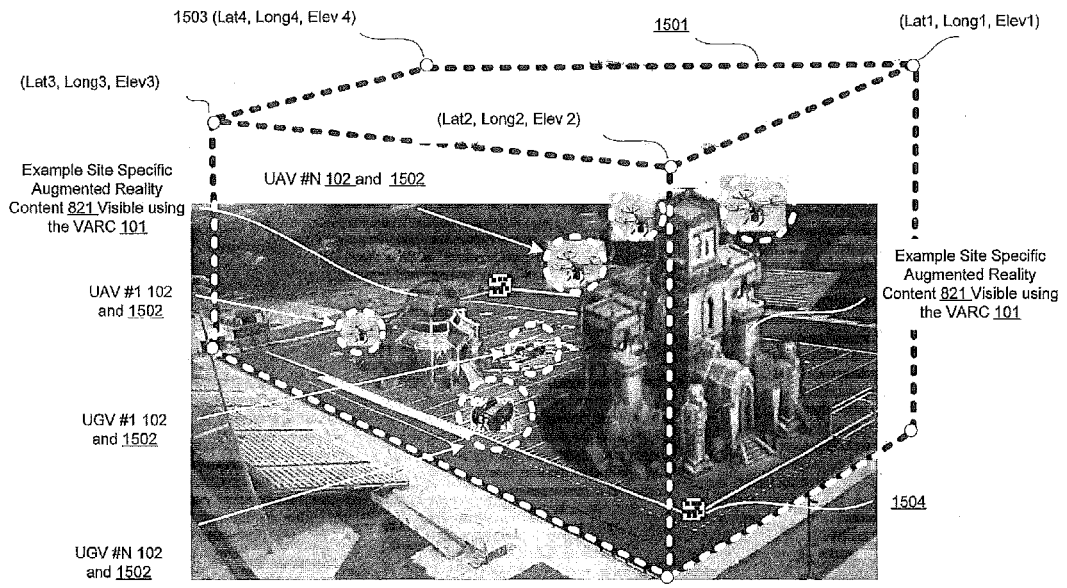
FIG. 18A - EXAMPLE GAMING PARDE IN REAL TIME AT A REAL ENVIRONMENT with UNIVERSAL GEOFENCE, PERSONAL GEOFENCE AND AUGMENTED CONTENT
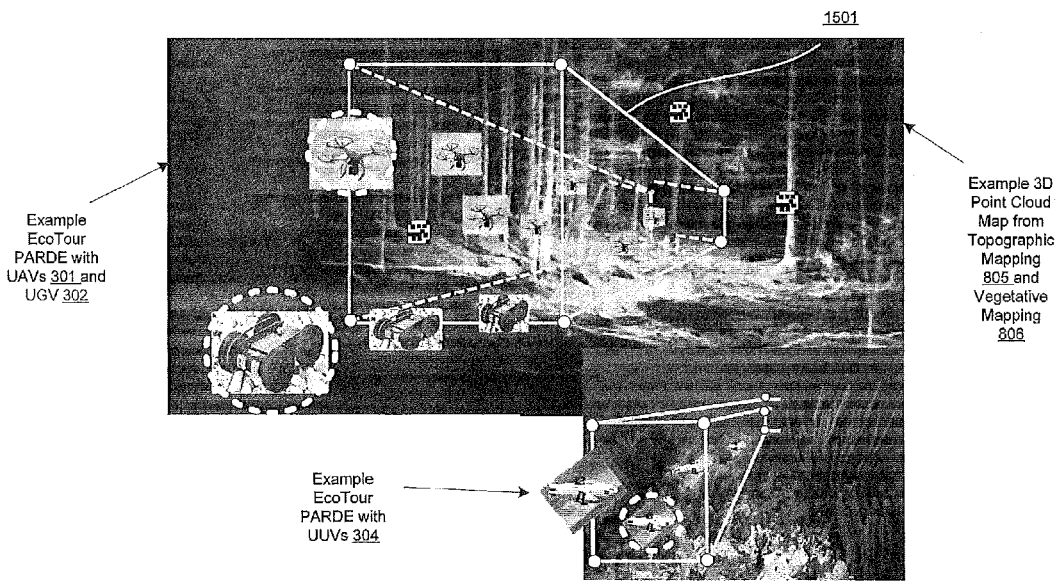
FIG. 18B - EXAMPLE ECOTOUR PARDE IN REAL TIME AT A REAL ENVIRONMENTS with UNIVERSAL GEOFENCE, PERSONAL GEOFENCE AND AUGMENTED CONTENT

VIRTUAL AND AUGMENTED REALITY COCKPIT AND OPERATIONAL CONTROL SYSTEMS

CROSS REFERENCE TO RELATED APPLICATION(S)

This patent application claims a benefit to the filing date of U.S. Provisional Patent Application Ser. No. 62/003,107, titled "Virtual and Augmented Reality Cockpit and Operational Control Systems for Operation on One or More Connected Semi-Autonomous Unmanned Systems Operating Within a Spatial Set of 3D Geo-Coordinates," that was filed on May 27, 2014. The subject matter of U.S. 62/003,107 is incorporated by reference herein in its entirety.

U.S. GOVERNMENT RIGHTS

N.A.

BACKGROUND

1. Field of the Disclosure

This invention relates to the field of modularized hardware and software for delivery and monitoring of a personalized augmented reality drone event (PARDE) mission plan based augmented reality experience piloting Unmanned Vehicles (UV) and the semi-autonomous, direct, and swarm, or flock control of the one or more UVs being piloted during the configured mission. Specifically it relates to a system of modular hardware and software which is configurable to support operation of a diverse range of UV platforms (i.e., unmanned aerial vehicles (UAVs), unmanned ground vehicles (UGVs), unmanned surface water vehicles (USVs), and unmanned underwater vehicles (UUVs)) operated by multiple pilots within a controlled and configured augmented reality PARDE mission plan that includes vision-integrated geo-fence management of UV location parameters and delivery of augmented visual, audio, motion and tactile content to the end-user UV pilots, or remote drone pilots (RDPs).

2. Description of Related Art

Unmanned vehicles have been around with increasing sophistication since the early 1900s—first as simple mechanical devices such as anti-aircraft mine-blimps, advancing into computerized platforms. A major limiting factor for autonomous and semi-autonomous UV operation s has been the need for a robust and accurate method to estimate position, without which UVs are very likely to cause damage to themselves and their surroundings. As capabilities in these areas have increased, UVs have become increasingly important in various civilian search and rescue, and military situations due to increases in platform and payload hardware, software sophistication and overall UV capability. Both military and civilian organizations now use UVs to conduct reconnaissance, search and rescue, and commercial use cases to reduce human risk and to increase the efficiency and effectiveness of mission execution. Much of this increase in capability derives from and depends on more accurate means of localization for vehicles within an environment, e.g GPS for outdoors. While GPS has advanced functionality, it has often been limited in terms of precision and robustness. For indoor applications, the precision issue has been solved with motion capture systems, but they are impractical for large-scale outdoor use.

A UV usually includes a device such as an engine for powered, controlled motion, a system for navigating, sensors for internal and external conditions, and an optional payload system. The onboard sensors often provide a remote user or observer with information such as vehicle pose, velocity, battery level, external levels of noise or physical agent, and video or laser data of surroundings which can be used for navigation or locating an individual or item. This is a small sample of available sensors, which are constantly increasing in functionality and sensitivity. UVs can be operated in autonomous, semi-autonomous, or direct (i.e., RDP controlled) control modes giving a pilot flexibility to configure a PARDE mission plan in which the UV may be operated in any one of the indicated modes, and flexibility to adjust control mode at any time.

With growing use and applicability of UVs across multiple industries and use cases, the advancement of UVs and virtual and augmented reality technologies, a system that supports individual piloting and overall flight control of one or a fleet of UVs is required. Furthermore, this system should enable piloting of UVs by individuals of varying piloting or driving experience and deliver PARDE mission plan with visual and audio augmented and interactive content to support successful completion of the specified mission and to provide an enhanced mission experience that increases mission success probability or pilot overall experience.

BRIEF SUMMARY

Disclosed herein is a system enabling varying levels of control over a diverse range of UV platforms operating simultaneously within a system configured set of mission parameters and defined spatial coordinates. The system includes the following components:

Unmanned Vehicle connect module,
Virtual and Augmented Reality Cockpit (VARC),
Operational Control System (OCS), and
PARDE Operating System Software (OS) that enables configuration of mission parameters and enables integration and seamless interaction between components.

The system supports a diverse range of UV platforms including UAVs, UGVs, USVs, and UUVs. The UV platforms are integrated into the system PARDE mission plans through a UV connect module that includes hardware and OS software components installed onto the UV. The UV includes required components for basic operation and control plus payload systems to carry-out current mission objectives including, but not limited to a frame and structure, power system, throttle controller(s), motor(s)/propulsion system(s), sensors, payload systems, piloting controls, audio and video systems, and a variety of payload systems and controls. The audio and visual systems may include camera(s), gimbals, microphones, speakers, and transmitter(s).

Sensors may include a global positioning system (GPS), sensors for velocity, battery level, external levels of noise or physical agent, and video or laser data of surroundings. If the PARDE is occurring within an outdoor distributed image network (ODIN—a defined network of images that allow high accuracy localization), data from optical sensors and GPS is combined to provide superior localization accuracy to within 1 cm of real world position. Payload systems may include one or more cameras, gimbals, infrared (IR) beam, gimbal, and targeting system, IR sensors, and light emitting diode (LED) systems.

The ground based operational control system enables a single control pilot (CP) to pre-configure the mission and mission parameters, monitor all VARCs (with RDP and Remote Drone Co-Pilots (RDCP)) and associated UVs operating within the mission, and can take direct, or autonomous over-ride control of any mission active UV, modify any mission parameters, and communicate with local officials as well as all pilots operating within the mission.

The OCS ground station receives and augments data from the UVs and passes it to users within the VARCs. The OCS also receives user commands and determines whether they violate any mission safety parameters, only passing through approved commands to the vehicles. Additionally, the OCS generates pre-configured augmented visual, audio, motion and tactile content and delivers that information to VARC users to enhance the user's mission environment and/or, increase probability of the user successfully completing the mission.

The OCS facilitates configuration of all mission parameters including, but not limited to, the following:
  Configuration of the mission spatial environment through three dimensional geo-coordinates,
  User accessible augmented audio and visual content tagged to geo-coordinates within the defined space,
  Define the fail-safe return home position within the defined space,
  Number and types of UVs to be controlled within the environment,
  VARC to UV pairing,
  VARC control system configuration (i.e, pilot or payload system control),
  VARC control system configuration for pilot experience level and preferences,
  VARC tactile motion level preference,
  Communication with one or more pilots operating in the environment,
  Communication systems with the Federal Aviation Authority (FAA), regulators, and local officials for pre, during, and post flight communication,
  Visually monitor all pilots operating within their VARCs,
  View each operating UV camera view,
  Shut down VARC control and pilot VARC experience, and
  Take over-ride control of one or more UVs through direct operator control or by pre-defined or new geo-coordinate way points to direct the UV to complete a task.

The UVs operating within the mission are controlled by the VARC system component. There is one user per VARC. Multiple VARCs may be linked to a single UV and the VARC may be designated for UV pilot control (RDP) or UV payload control (RDCP). The most sophisticated embodiment of the VARC is a cockpit that the pilot steps into and that closes completely around the pilot to provide a sound proof and light proof immersive mission environment that provides 6 degrees of motion and tactile and force feedback motion of the VARC based on UV sensor data delivery from the UV via the OCS and input to the VARC.

The VARC provides an integrated display system for UV camera view(s) (i.e, primary First Person View (FPV) or secondary UV camera payload view) with a Heads Up Display (HUD) system for real-time vehicle telemetry, mission parameters, and augmented, geo-coordinate coded, content that is interactive on-screen via physical, voice, and neural control systems. The VARC also includes communication and audio systems to interact with audio content, communicate with the CP or one or more other users operating in the current mission environment. The VARC also includes a shutdown option, which stops VARC control, opens the cockpit, and sets the UV to the fail-safe return home position.

Execution of the PARDE mission plan or choreographed travel plan along with delivery and retrieval of augmented content to the RDP/RDCPs within the VARC configuration is collectively called a Personalized Augmented Reality Drone Event.

BRIEF DESCRIPTION OF THE DRAWINGS

FIG. 1 is a pictorial representation of a personalized augmented reality drone event (PARDE) system in accordance with an embodiment disclosed herein.

FIG. 2 is a flow chart of an exemplary architecture for use with the embodiment depicted in FIG. 1.

FIG. 3 pictorially depicts unmanned vehicles for use with the PARDE systems disclosed herein.

FIG. 4 illustrates exemplary architecture for an unmanned vehicle for use with embodiments disclosed herein.

FIG. 5 illustrates exemplary architecture of an operational controls system for use with embodiments disclosed herein.

FIG. 6 pictorially depicts a virtual augmented reality cockpit system for use with the PARDE systems disclosed herein.

FIG. 6A depicts exemplary VARC system tactile and motion feedback components for use with embodiments disclosed herein.

FIG. 6B depicts exemplary VARC system visual components for use with embodiments disclosed herein.

FIG. 6C depicts exemplary VARC system audio components for use with embodiments disclosed herein.

FIG. 6D depicts exemplary VARC system control components for use with embodiments disclosed herein.

FIG. 7 illustrates exemplary VARC architecture for use with embodiments disclosed herein.

FIG. 8 illustrates exemplary personalized augmented reality drone event configuration settings architecture for use with embodiments disclosed herein.

FIG. 9 illustrates exemplary hierarchic object-oriented design (HOOD) PARDE operating system software for use with embodiments disclosed herein.

FIG. 10 illustrates exemplary HOOD PARDE visual data and settings for use with embodiments disclosed herein.

FIG. 11 illustrates exemplary HOOD PARDE audio data and settings for use with embodiments disclosed herein.

FIG. 12 illustrates exemplary HOOD PARDE tactile and motion data and settings for use with embodiments disclosed herein.

FIG. 13 illustrates exemplary HOOD PARDE environmental interface, payload control and gaming systems (payload) data and settings for use with embodiments disclosed herein.

FIG. 14 is an exemplary flowchart for a PARDE run for use with embodiments disclosed herein.

FIG. 15 is a graphical depiction of exemplary PARDE universal and personal geofencing in accordance with embodiments disclosed herein.

FIG. 16 is an exemplary flowchart depicting universal geofence logic in accordance with embodiments disclosed herein.

FIG. 17A is exemplary architecture depicting a signal loss to UV receiver event for use with embodiments disclosed herein.

FIG. 17B is exemplary architecture depicting a loss of GPS signal event for use with embodiments disclosed herein.

FIG. 17C is an exemplary architecture depicting a loss of both signal to UV receiver and GPS signal event for use with embodiments disclosed herein.

FIG. 18A is a pictorial illustration of an exemplary gaming PARDE in real time at a real environment with a universal geo-fence, a personal geo-fence and augmented content for use with embodiments disclosed herein.

FIG. 18B—is a pictorial illustration of an exemplary eco-tour PARDE in real time at a real environment with a universal geo-fence, a personal geo-fence and augmented content for use with embodiments disclosed herein.

Like reference numbers and designations in the various drawings indicated like elements.

DETAILED DESCRIPTION

One or more embodiments of the present invention are described. Nevertheless, it would be understood that various modifications may be made without departing from the spirit and scope of the invention. Accordingly, other embodiments are within the scope of the claims that follow this detailed description. This detailed description includes methods and means for managing and controlling one or more UV systems. The UVs utilize a networked swarm, or flock, awareness to allow operation of one or more UVs within a personalized augmented reality drone event. The UVs onboard systems may provide vehicle pose, object recognition, environmental interaction capabilities.

The RDP PARDE experience is setup, configured, and initiated, from an operational control system and by a certified control pilot. The CP monitors the PARDE and all participants throughout for safety and real-time PARDE parameter modifications to maximize the experience. Exemplary configurable event parameters include defining UV operating boundaries in terms of spatial geographical grids, image-triggered events, number of pilots participating, VARC flight control sensitivity (to allow users of varying skill levels to participate), and 'swarm' control level between pilots. These functionalities are enhanced both in precision and robustness by an outdoor distributed image network, a network of well-defined images or features which permits calculating vehicle pose to a higher degree than GPS alone. During each PARDE, the CP continuously monitors each pilot from the OCS and controls the experience parameters to ensure optimal safety. The OCS also includes integrated communication systems to interact with current PARDE participants as well as local safety officials and weather information.

Control of the UV can be achieved by commands from the remote drone pilot or by the control pilot from the OCS—Control and Monitoring Systems, or autonomously from the OCS based on PARDE parameters and position of a UV within the configured PARDE environment. Commands from the RDP and associated position of their UV in the PARDE environment are monitored for safety by an on-board autopilot and processor. The on-board autopilot and processor or on-board UV control system autonomously executes command overrides in event of a communications failure or inappropriate commands from the RDP in the VARC. RDP control of the vehicle is additionally constrained by the user's skill level, ranging from only field of view control to complete vehicle command.

The RDP user experiences the PARDE through a virtual augmented reality cockpit. The VARC provides an augmented reality (AR) visual and tactile experience tailored to the RDPs. The VARC, at its most basic embodiment may consist of virtual reality goggles for first person view from the UV and handheld UV remote controls. The full embodiment of the VARC may include the following key features:

Remote piloting of RDPs UV of choice within a defined geographical location (air, land, and water),
A heads up display for remote piloting of the UV via FPV,
Integrated audio and visual interactive content superimposed on the HUD,
RDP control of the on-screen interactive content and camera, infrared beam targeting, or other system payload controls,
Integration of multiple VARCs with the same UV allowing daisy chain of VARCs so that multiple RDPs are connected to the same UV, enjoying the same immersed PARDE experience, but controlling different payload systems to achieve their objectives.
Six degrees of cockpit motion and tactile feedback based on RDP's flight control systems and real-time telemetry being received from the UV itself, and
Communication systems to interact with a CP when needed and with other RDPs or RDCP who may be participating in the current PARDEs The autopilot unit receives and executes commands, as well as provides low-level environmental interaction such as vehicle stabilization by utilizing data from various sensors residing onboard the UV. This information can also be relayed to both onboard systems and ground-mounted OCS—Control and Monitoring Systems, which may provide correctional control to UVs to allow safe and objective operation.

Both the ground-mounted and onboard control systems may have the ability to safety check RDP commands to allow overriding a user's input if deemed unsafe. This determination is based on pre-compiled site and event specific PARDE libraries, which may define an enforced geo-fence of allowed 3-D volume, allowed speeds, and emergency obstacle avoidance parameters. The UV may be equipped with sensors and devices such as GPS or visual and auditory sensors that provide real-time data to the onboard system and the OCS.

Either the onboard or GPS may provide flight data information to external services such as emergency crews, as well as current PARDE mission plans and system status including UV condition. The OCS may allow new instructions to be configured during PARDE events to allow changes to pre-defined operational PARDE mission plans sent from the OCS. A PARDE mission plan may include multiple waypoints or destinations along which a UV may experience difficulties, which makes necessary the ability for the UV to receive real-time instructions given to facilitate an efficient and effective management of system conditions such as battery level and heat. To ensure compliance with operation PARDE mission plans, the OCS may continuously monitor the UVs current pose, speed, and acceleration.

FIG. 1 depicts and exemplary PARDE system including a plurality UVs 102 controlled from a plurality of VARCs 101 by remote drone pilots and remote drone co-pilots RDCPs 106. An operational control system 103 communicates with both the UVs 102 and the VARCs 101 via a wireless connectivity option 107. Co-located VARC and UV deployment options are represented by 105.

The UVs 102 may be air, ground, surface water, or underwater based UV types. Each UV type operating within a PARDE event does so within PARDE configuration settings which include data and settings such as RDP and RDCP control sensitivity and configuration preferences, all visual, audio, motion and tactile augmented content information, the PARDE universal geo-fence and each UV's personal geo-fence.

Each UVs 102 on-board processing system and the OCS 103 monitor and manage the speed, acceleration, and directional characteristics of each UV within the active PARDE environment and ensure UV speed, acceleration and directional characteristics and controls remain within PARDE configuration settings and make autonomous adjustments based on calculated PARDE configuration setting violations due to RDP or RDCP 106 manual inputs from their VARC 101 or other environmental and system factors that cause potential violations. The main components of each UV include a receiver, an on-board processing system, a global positioning system, one or more sensors, a transmitter, an on-board motion System, and an on-board payload and support system.

The UVs 102 on-board processing system in combination with the OCS 103 monitor, manage and transmit augmented audio and video content to the VARCs 101, which are being operated by RDPs and RDCPs 106. One or more VARCs 101 may be bound to a single UV 102. A single RDP 106 controls the motion and directional control systems of a single UV 102 via their VARC 101. Multiple RDCPs 106 may be bound to a single UV 102 and may control one or more on-board payload and support systems and provide sensor monitoring management. The VARC 101 provides an augmented reality visual, audio and tactile experience tailored to the RDP or the RDCP 106 controlling the system. The VARC 101, in a basic embodiment may be virtual reality goggles for first person view from the UV 102 and handheld UV remote controls. A full deployment of the VARC 101 immerses individual users into a sound and light proof environment where the RDP and RDCPs 106 experience the PARDE. The VARC 101 in this embodiment enables the user to remotely control their UV 102 while providing a real-time visual and tactile (6 degrees of motion) experience of what the UV 102 they are piloting is seeing and how it is physically oriented and reacting to the environment around it.

Additionally, the VARC system provides user communication options to a control pilot 104 and other users participating in the PARDE. The VARC display includes heads-up-display and receives video and audio content from the OCS 103 and on-board processing systems that with which the RDP and RDCPs 106 can interact. HUD content may include a variety of information that has been pre-configured via the PARDE configuration settings, such as land-mark indications and information, flight routes, and may include active gaming information on current game activity, user score, or additional information on RDPs and RDCPs 106 participating in the PARDE.

VARCs 101 include visual, audio, control, tactile and motion feedback along with processing and transmission systems. At a minimum, all VARC 101 embodiments include some form of visual, control, processing and transmission systems.

The OCS 103 is controlled and operated by a single (or multiple working in coordination with each other) control pilot 104. The OCS 103 enables the CP 104 to pre-configure the PARDE configuration settings, monitor all RDP and RDCPs 106 and associated UVs 102 operating within the mission. The CP 104 can take direct or autonomous over-ride control of any PARDE active UV 102 and has the ability to modify any PARDE configuration settings. The CP 104 also communicates with local officials and with any one, multiple, or all RDPs 106 within the PARDE.

The OCS 103 receives and augments data from the UVs 102 and passes it to users 106 within the VARCs 101. The OCS 103 also receives user 106 commands and determines whether they violate any mission safety parameters, only passing through approved commands to the vehicles 102. Additionally, the OCS 103 generates pre-configured augmented audio and video content and delivers that information to VARC users 106 to enhance the user's PARDE environment and/or, increase probability of the user 106 successfully completing the PARDE objectives.

The OCS 103 allows for configuration of all PARDE configuration settings including, but not limited to: configuration of mission spatial environment through three dimensional geo-coordinates, user accessible augmented audio and visual content tagged to geo-coordinates within a defined space, defined fail-safe return home position within the defined space, number and types of UVs 102 to be controlled within the environment, VARC 101 to UV 102 pairing, VARC 101 control system configuration (i.e, pilot or payload system control), VARC 101 control system configuration for pilot experience level and preferences, VARC 101 tactile motion level preference, communication with one or more pilots operating in the environment communication systems with FAA, regulators, and local officials for pre, during, and post flight communication and includes the ability to visually monitor all pilots 106 operating within their VARCs 101, view each operating UV camera view, shut down VARC control and pilot 106 VARC experience, take over-ride control of one or more UVs through direct operator 104 control or by pre-defined or new geo-coordinate way points to direct the UV 102 to complete a task.

Connectivity between the OCS 103 and VARCs 101 may be wired or wireless and connectivity 107 between OCS 103 and UVs 102 will be wireless. Connectivity protocols from the OCS 103 include sufficient bandwidth to ensure undiscernible lag of UV video feeds or delivery of augmented video and audio content from the OCS to the VARCs. Based on the connectivity flexibility with the OCS 103 the VARC deployment 105 may be central to the UV PARDE launch site or may be remote and limitless on the distance with the appropriate connectivity and bandwidth availability.

As noted above, the OCS may over-ride VARC command if safety considerations are violated, if universal geo-fence parameters are violated and if personal geo-fence parameters are violated.

There are several variables capable of activating the override if they go above or below a chosen threshold (e.g., safety considerations, geofence violations). Examples of such variables are velocity, altitude, proximity, global position etc. Exemplary pseudo-code is given below for how two UVs 102 detecting a violation of the universal geofence 1501 and personal geofences 1502 and implement override commands. The illustrative pseudo-code is for a simple box-shaped geofence:

include Corn puteReturnCommandFunction
include CollisionAvoidFunction;
float X1, X2, Y1, Y2, Z1, Z2. Xmin(0), Xmax(100), Ymin (0), YMax(200), Zmin(20), Zmax(100), VechileMinDist(2).

```
command=VARCCommand;
// Universal Geofence Override Logic
if (Xmax<(X1 or X2)){
command(X1 or X2) = ComputeReturnCommandFunction(X1 or X2, Xmax);
}
if (Xmin>(X1 or X2)){
command(X1 or X2) = ComputeReturnCommandFunction(X1 or X2, Xmin);
}
if (Ymax<(Y1 or Y2)){
command(Y1 or Y2) = ComputeReturnCommandFunction(Y1 or Y2, Ymax);
}
if (Ymin>(Y1 or Y2)){
command(Y1 or Y2) = ComputeReturnCommandFunction(Y1 or Y2, Ymin);
}
if (Zmax<(Z1 or Z2)){
command(Z1 or Z2) = ComputeReturnCommandFunction(Z1 or Z2, Zmax);
}
if (Zmin>(Z1 or Z2)){
command(Z1 or Z2) = ComputeReturnCommandFunction(Z1 or Z2, Xmin);
```

-continued

```
}
// Collision Avoidance/Personal Geofence Logic
if((X1−X2 or Y1−Y2)<=VehicleMinDist){
    command(X1 or Y1)= CollisonAvoidFunction(X1 or Y1, X2 or Y2);
    command(X2 or Y2)=CollisionAvoidFunction(X2 or Y2, X1 or Y1);
}
```

The "includes(Compute and Collision)" above tells the code where the functions it will need to run are defined. For example, if the UV 102 has gone beyond Xmax or Ymax (UniversalGeofence), a command in the negative X or Y direction would be generated by the ComputeReturnCommandFunction. Note that if none of the "if" statements apply, the command passed is simple VARCCommand, or the RDPs command. The collision avoidance, or Personal Geofence) is achieved much the same way, proximity in X or Y is detected, and appropriate function called to generated override command.

FIG. 2 is a flow chart of an exemplary architecture for use with the embodiment depicted in FIG. 1. FIG. 2 shows an Example Architecture for the Example PARDE System in Accordance to the Embodiments of the Invention. FIG. 2 shows the three main PARDE system architectural components including the UV 102, with the VARCs 101, and the OCS 103 and includes associated sub-components and inter-connectivity and relationships between components. The UVs 102 include a Receiver 205, Autopilot 211, Onboard Processor 212, Global Position System 206, Sensors 207, Transmitters 208, and Onboard Motion, Payload and Support Systems 213. The OCS 103 includes one or more OCS-CPU Node 203, External Communication systems 217, OCS Control & Monitoring System (OCSCMS) 218, Transmitters 219, Receivers 220, and PARDE Configuration and Settings 214. A Control Pilot 104, operates the OCS and overall PARDE event. The VARCs 101, include the VARC-Centric Signal Transmission, Receiving and VARC Processing Systems (VOP) 201 and the Controls and Interface Systems 223.

The UVs 102, VARCs 101, and the OCS 103 each run PARDE Operating System Software (Reference numeral 901 in FIG. 9) components that when initiated execute commands and manage systems and controls within the defined PARDE Configuration Settings 214. The PARDE Operating System Software 901 runs and executes commands on the UV Onboard Processor 212, OCS-CPU Node(s) 203, and the VARC Processing component 502. Communication and data transmission between systems is handled by the software components and transmitted between system components via either wireless or wired connectivity. Connectivity between the UVs 102 and the OCS 103 is wireless for all audio, video, and control functions between VARC 101 and OCS 103. Connectivity between the OCS 103 and VARC 101 may be wired or wireless. Wireless connectivity options may include, but is not limited to, Wi-Fi or satellite connectivity and optimal bandwidth will be employed to ensure no lag time or degradation of signal quality for audio, video, or control system transmissions.

There is one OCS 103 to execute and manage each PARDE event. Additional OCS Systems may be used as long as their use is coordinated. One or more UVs 101 can be associated to each PARDE event and there may be one or more VARCs associated to each UV. The OCS 103 and associated UVs 102 are deployed centrally to the PARDE event physical location. The VARC 101 deployments may be central to the PARDE launch site or may be remote with limitless distance based on having appropriate connectivity and bandwidth availability.

The OCS 103 consists of an OCS-CPU Node #n 203 ground based processor, and a CP. The ground based processor may be much more capable than the Onboard Processor (OP) 212 due to lack of weight restrictions, and in normal operating conditions is responsible for analyzing received UV data, determining vehicle pose, augmenting content received from UVs, forwarding the content to VARCs and RDPs, verifying RDP commands, and performing semi-autonomous overrides on RDP commands deemed dangerous. It also has the ability to send alerts to outside authorities in case of emergency. The CP has a manual override and acts as a redundant human safety check on the computers actions and decisions, and also can contact outside authorities.

The OCS CPU Node #n 203 includes required processing power and data storage necessary to execute the PARDE Operating System Software 901 (FIG. 9) and manage all associated processing required for generation and delivery of augmented video, audio, motion and tactile content to the VARCs 101. The OCS CPU Node #n 203 may be single or multiple laptops, PC, or server systems with varying CPUs and processing power. The combination of OCS CPUs may be networked together locally at the PARDE Event location and operating on battery or local power systems.

Alternately the OCS CPUs may be networked together with some of the processing occurring at the PARDE event location and some of the processing being done at a remote location or with all processing being done remotely and the local PARDE event system processing is accessing the PARDE Operating System software remotely to execute the PARDE event and all associated and required CPU processing requirements. The PARDE Operating System software layer of this system is architected to ensure flexible in networking configurability such that all PARDE Operating System Software OCS processes may be executed either all centrally, all remotely, or a combination of central and remote processing to the PARDE event location and associated OCS-CPU Node #n 203.

FIG. 3 pictorially depicts exemplary Unmanned Vehicles 102 with the following sub-categories: Unmanned Aerial Vehicles (UAV) 301, Unmanned Ground Vehicles (UGV) 302, Unmanned Surface Water Vehicles (USV) 303 and Unmanned Underwater Vehicles (UUG) 304. Unmanned Aerial Vehicles are categorized based on their primary flight mechanism: Unmanned Multi-rotor Aerial Vehicles 305, Unmanned Fixed Wing Aerial Vehicles 306 and Unmanned Aerial Animal Based Robotic Vehicles 307. Unmanned Ground Vehicles are categorized based on the machine to ground interface: Unmanned Track Mounted Ground Vehicles 308, Unmanned Wheel-based Ground Vehicles 309, Unmanned Multi-pod Ground Vehicles 310 and Unmanned Humanoid Robotic Vehicles 311. One subcategory for Unmanned Surface Water Vehicles is shown: Unmanned Fixed Hull Surface Water Vehicles 312. Unmanned Underwater Vehicles are Unmanned Fixed Shell Underwater Vehicles 313 and Unmanned Animal Based Underwater Robotic Vehicles 314. The term 'vehicles' as used above and throughout this patent means electro-mechanical machines able to transport and move in three dimensional space with control, propulsion and payload systems as described below.

As shown in FIG. 3, primary systems in each UV 102 include Receiver(s) 205, a Global Positioning System (GPS) 206, Sensors 207, Transmitters and data link systems 208, an Onboard Processing System (OPS) 210 and Onboard Motion, Payload and Support Systems (OMPSS) 213. Primary Onboard Motion, Payload and Support systems include Structural and Landing systems 409 and Propulsion and Steering Systems 410.

Secondary systems include PARDE dependent and specific Onboard Payload and Support Systems (OPSS) 408. Onboard Motion Systems 407 are the combination of Structural and Landing Systems 409 and Propulsion and Steering Systems 410. UV 102 movement can be initiated by creating forces leading to movement. Propulsion systems can have a source of mechanical power (some type of engine or motor, muscles), and some means of using this power to generate force, such as wheel and axles, propellers, a propulsive nozzle, wings, fins or legs. Structural components can be metal, plastic or composite materials. Landing system components can be Vertical Take Off and Landing (VTOL) components, runway driven, low-impact parachute and/or balloon, airbags or cushions. Components should be made of weatherproof and durable material and constructed and assembled to withstand environmental factors. Propulsion and Steering Systems 410 include commercial available components such as electronic speed control (ESC) motors.

Wireless receivers 205 can be infrared and ultrasonic remote control devices; professional land mobile radio (LMR), professional specialized mobile radio (SMR); consumer two way radio including family radio service, general mobile radio service (GMRS) and Citizen's band (CB) radios; amateur radio (Ham radio); consumer and professional marine VHF radios; air-band and radio navigation equipment used by aviators and air traffic control; cellular telephone; wireless USB or Bluetooth; satellite, and/or Wi-Fi.

Most embodiments have a GPS 206 that records and transmits the latitude and longitude of the UV 102 with an accuracy of less than one meter. The latitude and longitude of the GPS unit is typically determined by receiving GPS satellite broadcast signals (carrier frequency with modulation) that includes a pseudorandom code (sequence of ones and zeros) that is known to the receiver. By time-aligning a receiver-generated version and the receiver-measured version of the code, the time of arrival (TOA) of a defined point in the code sequence, called an epoch, can be found in the receiver clock time scale. The message that includes the time of transmission (TOT) of the code epoch (in GPS system time scale) and the satellite position at that time is also received by the receiver. The receiver measures the TOAs (according to its own clock) of four or more satellite signals. From the TOAs and the TOTs, the receiver forms four time of flight (TOF) values, which are (given the speed of light) approximately equivalent to receiver-satellite range differences. The receiver then computes its three-dimensional position and clock deviation from the four TOFs. The receiver position (in three dimensional Cartesian coordinates with origin at the earth's center) and the offset of the receiver clock relative to GPS system time are computed simultaneously, using the navigation equations to process the TOFs. The receiver's earth-centered solution location is usually converted to latitude and longitude relative to an ellipsoidal earth model. These coordinates may be displayed (e.g. on a moving map display) and/or recorded and/or used by other systems (e.g., vehicle guidance).

Onboard Sensors 207 are for flight or vehicle management and control capturing audio and visual signals from the UV location and field of view for transmission to the OCS—Control and Monitoring Systems 218. For PARDEs that require a high level of precision with respect to UV locations, sensors may include the following to augment GPS 206 data: Laser Sensors 401, Optical Sensors (including infrared (IR)) 402, Altimeters and/or Acoustic Depth Finders 404. Laser Sensors 401 field measure in real time UV height and distances from site obstacles and features. As described in more detail later, Optical Sensors capture real time images of the PARDE location making sure to specifically locate in their field of view pre-located QR (quick response) codes (or site specific landmarks) for geo-referencing. There may be separate optical sensors for navigation assistance and for payload support systems.

Additional Onboard Sensors 207 include Gyroscope(s) 403 for flight control, Unexpected Obstacle Avoidance 405 and Critical Systems 406 for monitoring battery power and emergency maneuvers and notification. LIDAR (light detection and ranging) System Sensors 414 can be used to real-time mapping, Sonar Sensors 415 and Pressure Sensors 413 may also be used to relay information back to the OCS 103 and RDP or CP.

Transmitters and data link systems 208 may include a radio controlled transmitter, Wi-Fi, or satellite wireless systems. A radio transmitter connected to an antenna producing an electromagnetic signal such as in radio and television broadcasting, two way communications or radar. Transmitters must meet use requirements including the frequency of operation, the type of modulation, the stability and purity of the resulting signal, the efficiency of power use, and the power level required to meet the system design objectives. Transmitters generate a carrier signal which is normally sinusoidal, optionally one or more frequency multiplication stages, a modulator, a power amplifier, and a filter and matching network to connect to an antenna. A very simple transmitter might contain only a continuously running oscillator coupled to some antenna system. More elaborate transmitters allow better control over the modulation of the emitted signal and improve the stability of the transmitted frequency.

For transmitter and data link systems 208 relying on Wi-Fi, the UV has to be equipped with a wireless network interface controller. The combination of computer and interface controller is called a station. All stations share a single radio frequency communication channel. Transmissions on this channel are received by all stations within range. The hardware does not signal the user that the transmission was delivered and is therefore called a best-effort delivery mechanism. A carrier wave is used to transmit the data in packets, referred to as "Ethernet frames". Each station is constantly tuned in on the radio frequency communication channel to pick up available transmissions. Wi-Fi technology may be used to provide Internet access to devices that are within the range of a wireless network that is connected to the Internet. The coverage of one or more interconnected access points (hotspots) can extend from an area as small as a few rooms to as large as many square miles. Coverage in the larger area may require a group of access points with overlapping coverage. Electronic signal repeaters may be needed to extend the wireless signal to the entire PARDE local.

Onboard Processing Systems (OPS) 210 include Autopilot hardware and software 211 and an Onboard Processor (OP) 212. Autopilot hardware and software can be open-source autopilot systems oriented toward inexpensive autonomous aircraft. An autopilot allows a remotely piloted aircraft to be flown out of sight. All hardware and software can be open-source and freely available to anyone under licensing or applicable agreements. Free software autopilots provide more flexible hardware and software. Autopilot hardware and software 211 is modified as described below to include special flight control requirements.

An Onboard Processor 212 is a computer processing unit and uninterruptable power supply (UPS) onboard individual UVs 102. One function of the Onboard Processor is to process and compress video signals from Optical Sensors 402 prior to transmission to the OCS-CPU Node #n 203, processing of GPS 206 data and Optical Sensor 402 data for determining UV 102 location(s), and return home fail-safe flight control in the event of loss of signal from the OCS 103.

FIG. 4 illustrates exemplary architecture for an unmanned vehicle for use with embodiments disclosed herein. Integral to the architecture is modularity and adaptability to vehicles regardless of their classification (i.e., UAV 301, UGV 302, USV 303 or UUV 304). While components such as Onboard Processing Systems 210 and Onboard Motion, Payload and Support Systems 213 are adapted and designed for compatibility and functionality for the various vehicle classifications, several components including GPS 206, Sensors 207, Receivers 205 and Transmitters 208 have less need for specialization.

On board Payload and Support Systems (OPSS) 408 can include items such high-resolution cameras, IR and thermography imaging systems or other sensory systems. Systems to include various camera types with different focal lengths and sensor sizes (RGB, multi-spectral camera), gaming accessories (e.g., IR beam for targeting, optical sensor/receiver for measuring 'hits').

As shown in FIG. 4, the UVs are provided approved Remote Drone Pilot (RDP) Commands or Override Commands 209 from the OCS 103. As previously discussed, RDPs and RDCPs commands are processed and assessed for consistency with the PARDE mission plan, safety requirements, etc. prior to being transmitted to the UVs 102. Override commands to the UV are implemented at the discretion of the Control Pilot 104 and PARDE specific flight rules. Data from onboard Sensors will be transmitted to the OCS 103 and Onboard Processor 212. Sensors have flight control and monitoring duties and may be used as the primary flight guidance tools in the event contact to the OCS 103 is lost and/or the GPS 206 signal is unavailable. Loss of signal and resulting control architecture is presented in more detail in FIGS. 16A, 16B and 16C. Basic functionality of the UV 102 is presented in Table 1.

TABLE 1

Functionality of UV 102

| Functional Category | UV 102 Related Architecture, Functionality and System Responses |
|---|---|
| RDP, RDCP 106 and CP 104 Communications to/from real environment of UV 102 | Onboard microphone and speakers through Environmental Interface Systems 411. Allows for real-time audio of the UV's surrounding environment and RDP and/or RDCP ability to communicate to individuals or other systems within the PARDE event. |
| OCS 103 Monitoring of UV 102 and VARC 101 | Optical Sensors 402 capture Drone's Eye View. Image(s) can be pre-processed using OP 212 prior to transmission to reduce bit transmission rates necessary for undetectable, or minimal, image lag. Laser Sensors 401 capture distances from the ground and other objects. Gyroscopes 403 measure the orientation of the vehicle. Altimeter or Acoustic Depth Finder 404 records distance above the ground surface or below the water surface. Critical Systems monitoring 406 include battery power and communication systems' status. Infrared sensors 413, LIDAR 414 and Sonar 415 sensors can be used for flight control primary or redundant systems' monitoring. |
| OCS 103 Override Control of UV 102 | Commercially available Autopilot 211 hardware and software (e.g., Arduplane (air), or Ardurover (land and water)) shall be modified to implement additional autonomous and semi-autonomous flight controls within the PARDE event with regard to redundant safety features, universal and personnel Geofence conditions and pre-programmed PARDE content delivery. Data processing in the OP 212 of GPS 205 and Sensor 207 data to prevent critical systems failures and direct transmission of data to the OCS 103 for processing.<br>Override from the OCS 103 system can include pre-programmed flight control responses to varying proximity to the universal Geofence, sensitivity to the personal Geofence of other UVs 102, and pre-programmed or real-time PARDE content and conditions. |
| CP 104 Override Control of UV 102 | Control Pilot monitoring the UV 102 and other systems may take direct flight control of all systems by transmitting the Approved Remote Drone Pilot Commands 209. |
| CP 104 Semi-direct Override control of UV 102 | Control Pilot monitoring the UV 102 and other systems may take direct control of one or more systems but not all systems as discussed above. Examples may be partial control of flight systems while the RDP control augmented content delivery. Another example is the CP taking control of direction and altitude while the RDP continues to control vehicle speed. Approved Remote Drone Pilot Commands 209 received from OCS 103 to Receiver 205. |
| Fail-Safe Shut Down of UV 102 | UVs 102 OP 212 will process modified Autopilot 211 commands to either return "home", to a pre-determined safe landing area, or emergency landing via parachute, etc. Redundant commands will be transmitted from OCS 103 through Approved Remote Drone Pilot (RDP) 209. Return to base in case of lost signal will be handled by the Autopilot 211. |
| Swarm, Flock or Autonomous Clustering Setting from OCS 103 to UVs 102 | Through pre-programmed flight controls from the OCS 103 or directional control of the CP through approved RDP Command or Override Commands 209, individual UVs 102 will be used together in one or more PARDES to exhibit swarm behavior, which is a collective behavior exhibited by animals or machines which aggregate together, milling about the same spot or moving en masse or migrating in some direction. The number of UVs that may be operating within a PARDE is scalable by orders of magnitude. This is possible through the redundant 3D localization which allows swarm dynamics of large numbers of vehicles. |

TABLE 1-continued

Functionality of UV 102

| Functional Category | UV 102 Related Architecture, Functionality and System Responses |
|---|---|
| | Programming from the OCS 103 will use metric distance models, topological distance models, or equivalent models to define swarm behavior. Mathematical models of swarms represent individual UVs following three rules: 1) Move in the same direction as your neighbors, 2) Remain close to your neighbors, and 3) Avoid collisions with your neighbors. Commercially available swarm algorithms view the swarm as a field, working with the density of the swarm and deriving mean field properties. However, most models work using an agent-based model following the individual agents (points or particles) that make up the swarm. Individual particle models can follow information on heading and spacing.<br>The OCS imparts swarm behavior which enhances coordination and safety by having accurate real-time position data from all vehicles within the PARDE. This allows control of anything from a single vehicle to all vehicles simultaneously. Various missions can be programmed in while objectives such as Collision Avoidance/Personal Geofence behavior, and/or staying within a set Universal Geofence area will still be highest priority. |
| Software & Operating System for VARC 101, UV 102, and OCS 103 Communication and Integration | Compatible software components installed on the VARC 101, UVs 102 and OCS 103 that enable interoperability for all defined features and functions of the system. FIG. 9 presents a Hierarchic Object-Oriented Design graphic of the PARDE Operating System software components. |
| Web Portal 701 (FIG. 7) for RDP and RDCP 106 Access and Profile Configuration | OCS 103 shall have a web-portal for RDP 106 access allowing entry and updating of configured settings for PARDE delivery. |
| UV 102 Identification | Each UV 102 #M will be uniquely identified within the OCS 103. UV information such as type, structure configuration, power, video, and payload systems information will be managed in the OCS 103. |
| UV 102 Onboard Payload and Support Systems (OPSS) 408 | Onboard Payload and Support Systems (OPSS) include Environmental Interface Systems 411 and Gaming Systems 412.<br>Environmental Interface Systems can include speakers, lights, robotic sensors, chemical sensors, manipulators, etc. They will be PARDE specific and closely integrated with the PARDE Augmented Content delivery.<br>Gaming Systems 412 on the UV can be infrared beams and/or video targeting system to attach other UVs in the PARDE. Programmed game rules and will be stored in the OCS 103. Real or virtual "damage" to the RDP 106 UV 102 or over UVs can be tracked to eliminate another UV from a gaming PARDE.<br>Optical Sensors 402 can be infra-red to read and measures beam impacts ('hits') and effect a change to the OCS 103 that simulates damage to the UV. |
| UV 102 Lighting Systems | UVs 102 can include lighting systems for illumination of surrounding environment and/or visual status indication of UV (e.g., powered up, powered down, hit damage, under VARC Control, under OCS CP control, etc.). Setting can be locally on the UV in the OPS 210. Onboard Payload and Support Systems 411 and Gaming Systems 412 can have lighting components. |
| UV Sensors 207 and Wireless Communications 107 | Each UV 102 may be outfitted with various sensors 207 including Laser Sensors 401, Optical Sensors (including Infrared (IR)) 402, Gyroscopes 403, Altimeters 404, Unexpected Obstacle Avoidance 405, Critical Systems monitoring Sensors 406, Pressure Sensors 413, Lidar sensors 414, and Sonar Sensors 415.<br>Data transmission of sensor data to OCS 103 and VARC 101 using Wireless Communications 107 such as remote control, Wi-Fi, satellite communications, or other systems. |
| UV 102 First Person View (FPV) video systems (Drone's Eye View) | Combine virtual reality (VR) head mounted displays (HMDs) with (UV) technology to RDP 106 or control payload on a UV 102 through a Virtual Reality Headset, computer screen or tablet. A UV mounted with cameras which streams video to a VR headset, or equal.<br>Control the flight of a UV through its remote controller, while the RDP at the same time is being shown the flight through an immersive video medium. The RDP also has the choice to look around due to the camera platform being synchronized with the head tracking sensors in the HMD. The camera (Optical Sensors 402) is mounted to a platform Onboard Payload and Support Systems 408.<br>The servo positions on the camera mounts can be synchronized to HMD orientation by extracting the vector components which in sum represent the direction the HMD is pointing. The direction coordinates produced in the headset are converted into a range which will be used to steer the servos. The coordinates are modified to be contained within a specific range, |

TABLE 1-continued

Functionality of UV 102

| Functional Category | UV 102 Related Architecture, Functionality and System Responses |
|---|---|
| | which is dictated by the rotational reach of the servos. The modified coordinates can then be sent by serial wireless transmission (Transmitters 208), or equal
The cameras (Optical Sensors 402) mounted on the UV will transmit video to the OCS 103 and ultimately to the VARC 101. Composite video is converted to digital format enabling processing of the video stream. This conversion can be done by an external composite to USB device. The video stream is then subjected to real time manipulation, which serves the purpose of distorting the images into a format which can be viewed in the head mounted display.
Include multiple camera and video systems via Optical Sensors 402 and stabilization systems (e.g., brushless gimbal or equal) as part of Onboard Payload and Support Systems 409. Each UV 102 camera system can include multiple cameras to enable operator switching to view full 360° or pre-fabricated $3^{rd}$ party providers such as Bubblcam (bubl, Toronto, Canada), Giroptic (Lille, France) or 360Fly (Pittsburgh, PA)). An RDP and multiple RDCP may access and view differing parts of the captured real-time video. Video may be HD70p, HD 1080p, NTSC or better including composite of 3840-by-3840 pixel photographs. |
| Create PARDE "Library" with Spatial Data, Site Settings and Preferences 215 and Augmented Content Data and Settings 216 | PARDE templates include storage of parameters for UV 102 system flight control and content delivery specific to the type and location of each PARDE. Exemplary parameters include: PARDE boundaries, maximum speeds and altitudes, site specific information such as vegetation and wildlife, games rules, and others. Additional PARDE configuration settings can be transmitted from the OCS 103. |
| Creation of PARDE Templates | Sensor 207 and GPS 206 data delivered to OCS 103 and VARC 101 for use in UVs 102. Augmented content and configuration from OCS 103. |
| PARDE Type Setting | PARDEs can be categorized into "Types" of PARDEs such as educational, recreational, health and wellness and other. Each PARDE type may have its own UV 102 centric settings and constraints. |
| Unmanned Vehicle (UV) 102 Type | Each event will have UVs uniquely identified in the OCS 103. There will be a unique code associated to each UV that represent type of UV land, air, surface water, or submersible UV Type and specific to the individual UV. Unmanned Aerial Vehicles (UAV) 301 may be Multi-rotor Aerial Vehicles 305, Fixed Wing 306, or Aerial Animal Based Robotic Vehicles 307. Unmanned Ground Based Vehicles 302 may be Track Mounted Ground Vehicles 308, Wheel Based Ground Vehicles 309 (e.g., street race cars, off-road trucks, buggy, trucks, or "monster" trucks), Multi-pod Vehicles 310 or Humanoid Robotic Vehicles 311. Unmanned Surface Water Vehicles 303 can include Fixed Hull or Inflatable Hull Surface Water Vehicles 312. Unmanned Underwater Vehicles 304 can include Fixed Shell Underwater Vehicles 313 or Underwater Animal Based Robotic Vehicles 314. |
| UV 102 to PARDE Association | To participate in an authorized PARDE, the OCS 103 must have an acceptable UV 102 to PARDE binding. |
| VARC 101 to RDP and/or RDCP 106 Profile Pairing | Can be pre-set or configured real-time that sets the rules and protocols for how the UV 102 responds to RDP and/or RDCP controls according to configuration settings. |
| VARC 101 to UV 102 Pairing | Can be pre-set or configured real-time that sets the rules and protocols for how the UV 102 responds to VARC 101 controls according to configuration settings. |
| Multiple VARC 101 to UV 102 Daisy Chain | Multiple VARCs 101 connected to a single UV can respond both for tactile and motion simulation, but for field of view and augmented content delivery, RDPs and RDCPs can have content delivered that is independent of the other users. Daisy chains according to paired VARC 101 and associated Control Type configured (autonomous or semi-autonomous) |
| UV 102 and VARC 101 Control Type and Motion Control Systems 605 | Control Type and Motion Control Systems 605 based in part on mode of autonomous vehicle (i.e., air, ground, surface or underwater). VARC 101 Control Type and Motion Control Systems including yolks, steering wells, buttons, pedals, throttles, brakes responds according to configured pairing of VARC and associated Control Type. Systems can be configured directly or through use of the OCS 103. Will include commercially available manufactured parts such as electronic speed control (ESC) motors. |
| RDP and RDCP 106 VARC 101 Control Layout Configurability | UVs 102 are controlled via Motion Control Systems 605 and Payload Control Systems 607 based on the classification of the UV 102, as well as other factors. The layout of the controls on the VARC 101 can be configured to align with the individual RDP or RDCP 106 preferences. Control settings and configuration can occur through the OCS 103. |
| RDP and RDCP 106 Profile Settings 702 | Settings can be preset or changed in real time to align with the preferences of the RDP and RDCP 106 provided they are approved by the CP 104 and consistent with safety and communication protocols. RDP and RDCP Settings 702 include: Language preferences 703, Skill Level 704, |

TABLE 1-continued

Functionality of UV 102

| Functional Category | UV 102 Related Architecture, Functionality and System Responses |
|---|---|
| | Augmented Reality (AR) Content Preferences 705 and Additional Settings 706. The UV 102 paired with the RDP 106 will be respond based on RDP and RDCP 106 Profile Settings 702. Control settings and configuration can occur through the OCS 103.<br>1404 is a visual representation of the differing levels of control of UVs available to RDPs based on individual skill level. This level may be assessed before a RDP's first PARDE experience, then loaded or modified as appropriate for future PARDEs. As shown in FIG. 14, the higher the RDPs skill level the more vehicular control is granted.<br>Beginner level RDPs may only have interactive access to the field of view presented to them, so a novices PARDE experience may be analogous to a rollercoaster which does not give any control to passengers. Intermediate skill level RDPs may have access to 3D maneuvering within the space permitted by the Universal Geofence, subject to maximum throttle/acceleration and velocity restrictions. Expert level RDPs may have full control of the vehicle.<br>All levels of skill are subject to both Universal and Personal Geofences, and accompanying OCS safety overrides. |
| Pilot control sensitivity configurability | Responds based on VARC configuration changes. |
| VARC Six Degrees of Motion Intensity configurability | Sends motion characteristic sensor data to simulate UV 102 motion at VARC 101. |
| VARC tactile force feedback intensity configuration | Sends system orientation sensor data to simulate VARC and control system tactile feedback. |
| PARDE Universal Geofence 1501 and Personal Geofence Areas 1502 | The Personal Geofence is a defined 3D bubble around individual UVs which is not allowed to overlap with another UVs individual geofence. Any command by a RDP(s) to bring UVs close enough to violate this rule will result in the OCS overriding their commands and separating the vehicles to an acceptable distance. UV1 and UV2 in the figure show the closest proximity two UVs may be allowed before OCS override of commands.<br>For the Universal Geofence settings, a three dimensional volume is either pre-set or configured real time by the Control Pilot 104 using a combination of x, y and z coordinates. The x and y limits correspond to GPS latitude and longitude readings and the z direction is either an altimeter or depth finder. Also set are "buffer zones" within the Geofenced areas that initiate some action by the UVs 102 including autonomous flight control behavior so that the UV 102 does not exit the approved Geofence areas.<br>Geofencing will be achieved via onboard GPS 206. Collision avoidance of unexpected obstacles in case of lost signal will be handled by the Onboard Processor 212.<br>Data will be interpreted by the Autopilot 211 (PX-4 or similar) using Flight Management Software in the OCS 103 such as "Q-GroundControl". Fleet dynamics rules that already exist for the autopilot and will be used and an additional buffer for each unit will be assigned. Rules for semi-autonomous override, or alerting of CP, will be based on a weighted distance and velocity algorithms.<br>The Universal Geofence is the 3D box in which all UVs operating during a specific PARDE are contained. This is the allowed volume of the PARDE staging area where RDPs may direct their UV. Any attempt to leave this area will result in the OCS 103 overriding RDP commands and bringing the UV back to a set distance from the Universal Geofence.<br>The buffer zones will be set based on PARDE parameters and RDP skill levels. |
| Fail Safe Configuration of the UV 102 for Loss of UV Receiver, GPS or Both | UV on-board GPS 206 optimally provides vehicle localization; in cases of GPS signal loss the Onboard Processor 212 redundantly provides vehicle localization based on visual processing algorithms. In case of command signal loss, the autopilot will return the vehicle to its origin point, if GPS signal is also lost it will do the same based off the onboard processor visual processing.<br>FIGS. 17A, 17B and 17C are visual representations of the safety protocols for various loss of signal scenarios. GPS 206, Sensors 207, Receiver 205 and the Onboard Processing Systems (OPS) 210 function redundantly to allow for a high degree of certainty with respect to UV 102 location. Loss of Signal 1601 can occur from these systems. When the GPS 206 signal is lost, sensor 207 visual cues can be used with processing by the OCS 103 for safe return to an approved "home base", landing or staging area.<br>If the Loss of Signal 1701 is to the receiver 205, GPS 206 and Visual Cues 1702 together are processed in the OPS 210 to direct a safe return of the UV 102. |

TABLE 1-continued

Functionality of UV 102

| Functional Category | UV 102 Related Architecture, Functionality and System Responses |
|---|---|
| | If the Loss of Signal is to both the receiver 205 and GPS 206 system, Visual Cues 1702 from the Sensor 207 could be processed in the OPS 210 to direct a safe return of the UV 102. |
| PARDE Configuration Validation | For systems' check to ensure all required configuration settings are input prior to operation in a PARDE event. Primarily an OCS 103 function with UV 102 compatibility and configuration checks. |
| "PARDE's Over" or Safe Return Home | UV 102 returns to "home-base" or preapproved safe landing or staging area. Can be programed through OCS 103, Autopilot 211 or Onboard processor (OP) 212. |
| Configuration of Augmented Audio Content | Augmented Audio Content can be programmed into the OCS 103 for delivery to either the UV 102 (for example in bird "call-back" surveys) or to the VARC 101. Audio can be stored files or real-time from microphones installed in the Onboard Payload and Support Systems 408. Audio can be configured to play at specific GPS locals, at timed intervals or at the retrieval preference of the RDP or RDCP 106. |
| Configuration of Augmented Visual Content | Augmented Visual Content can be programmed into the OCS 103 for delivery to either the UV 102 or to the VARC 101. Visual content can be stored video, graphical or hologram files or animation overlaid real-time video from cameras installed on the UV 102 Optical Sensors 402 or the Onboard Payload and Support Systems 408. Visual content can be configured to play at specific GPS locals, at timed intervals or at the retrieval preference of the RDP or RDCP 106. 3D maps and rules will be loaded into the system specific to each PARDE. |
| Configuration of Augmented Tactile and Motion Content | Augmented Tactile and Motion Content can be programmed into the OCS 103 for delivery to the VARC 101. Tactile and Motion content can be stored files or real-time based on sensor 207 data (e.g., Gyroscope and Accelerometer 403 data) installed on the UV 102 or the Onboard Payload and Support Systems 408. Tactile and Motion content can be configured to run at specific GPS locals, at timed intervals or at the retrieval preference of the RDP or RDCP 106. |
| CP 104 Displays and Graphical Generator | Includes receiving 506 data from UV 102 sensors 207 and generating onscreen display for the CP 531 Interface. |
| Delivery of Augmented Audio content to RDP or RDCP 106 or to CP 104 | Augmented Audio Content is heard by the RDP and RDCP 106 through the Audio Systems 603 on the VARC 101 and by the CP 104 through the OCS 103 CP Interface 531 Audio Speakers 529. |
| Display of Augmented Visual content to RDP or RDCP 106 or to CP 104 | Augmented Visual Content is seen by the RDP and RDCP 106 through the Visual Systems 602 on the VARC 101 and by the CP 104 through the OCS 103 CP Interface 531 Monitor 528. |
| RDP 106 Control Systems 604 | Controls systems on UV 102 operated from VARC 101 Control Systems 604. Systems include Motion Control Systems 605, Environmental Interface Systems 606, Payload Control Systems 607, Gaming Systems 608 and Sensors 609. UV 102 responds to RDP control inputs in real-time through approved RDP Commands or Override Commands 209. |
| VARC 101 Motion Feedback | Sensors 207 and GPS 206 data for real-time position, orientation and motion changes will be directed through the OCS 103 to the VARC 101 Tactile and Motion Feedback 601 systems. Motion can be delivered in this system to the VARC Motion Chairs 610 or 3D Motion Chair Pod 611 using electro-mechanical or pneumatic systems, motors, gears and servos. The degree of motion and its sensitivity to UV 102 movement is configurable. Motion can be translational or rotational or a combination of the two. Motion directional feedback to include yaw, pitch, roll, up, down, left, right and/or forward. |
| VARC 101 Tactile Feedback | Sensors 207 and GPS 206 data for real-time position, orientation and motion changes will be directed through the OCS 103 to the VARC 101 Tactile and Motion Feedback 601 systems. Tactile feedback including Olfactory Inputs 612, Moisture Inputs 613 or Heat and Air Inputs 614 can be delivered in this system to the VARC using spray nozzles, heaters, air conditioning units and "perfumes". The amount of feedback and their sensitivity to UV 102 movement and location is configurable. |
| Decentralized Deployment of UVs 102 and VARCs 101 | UVs 102 can operate as expected regardless of VARC 101 locations. All movement is controlled and supervised using the OCS 103 and CP 104. UVs 102 and VARCs 101 may be deployed at the same local 105. |

FIG. 6 presents an exemplary Virtual Augmented Reality Cockpit (VARC) #N 101 in accordance with embodiments disclosed herein. Components of the VARC can include: VARC-Centric signal Transmission, Receiving and VARC Onboard Processing Systems 201, Visual Systems 602, Audio Systems 603, Control Systems 604 and Tactile and Motion Feedback Systems 601. A VARC can be used by Remote Drone Pilots (RDP)s or Remote Drone Co-pilots (RDCP) 106 or Control Pilots (CP) 104. FIGS. 6A through 6D present variations and embodiments of the various components.

FIG. 6A illustrate VARC System Tactile and Motion Feedback Components 601 such as: Motion Chair 610 with up to 6 degrees of freedom 625. A self-enclosed 3D Motion Pod 611 would also have up to 6 degrees of freedom 625 with respect to motion. During a PARDE, tactile feedback is provided to the pilot(s) including scents delivered using spray nozzles or vaporizers and Olfactory Inputs 612 such as perfumes. Moisture Inputs 613 can be integrated through water spray nozzles. Heat and Air (wind) Inputs 614 can be incorporated as well.

FIG. 6B shows exemplary VARC Visual System Components 602 including large Screen televisions, monitors 615 or flexible wallpaper televisions. Virtual Reality (VR) goggles 616 are available from third party providers such as Rift from Oculus (Menlo Park, Calif.), Google glass from Google (Mountain View, Calif.), Samsung products (Ridgefield, N.J.) or equivalent product. Lastly, a simple computer screen, tablet or smart phone 617 could be used to visualize content.

FIG. 6C presents two examples for Audio System Components 603 delivering and receiving on the VARC including a standard earbud and/or Headset and Microphone 618 and Speakers 619.

Control Systems for the VARC include: Motion and Control Systems 605, Environmental Interface Systems (Speakers, Lights, Robotic Physical and Chemical Sensors and Manipulators) 606, Payload Control Systems 607, Gaming Systems 608 and Sensors 609.

FIG. 6D presents exemplary VARC Control System Components 604 and control methods that include the use of Joysticks, Yolks and/or Pedals 620, Kinematic and motion sensor controls 621 and Neurotelepathic Control 622 either Wired 623 or Wirelessly 624.

Variations and combinations of the audio and visual components could be made for instance into a gel-helmet, form fitting to the pilots head.

VARC Embodiments

The VARC 101 at its simplest may consist of VR Goggles 616 and a hand held radio controlled joystick and controllers 620. A high end version of the VARC could include a motion capable chair which will simulate the UV orientation, speakers, and a screen or goggles. A PARDE may contain one or more users all utilizing a single OCS 103. A single UV may have multiple VARCs 101 and RDPs 106 utilizing it. One RDP may be 'primary' and have vehicular control while the others may be 'secondary' and may only have control over their field of view. A single VARC and RDP may switch between different UV platforms, of either the same type (UAV 301, UGV 302, USV 303 or UUV 304) or of a different type.

The PARDE experience in the VARC 101 for the pilot may include augmented virtual content, overlaid on the UV data by the OCS 103. This additional content may be visual, auditory, or tactile in nature, such as a virtual guide or the sound and overpressure of a virtual explosion.

VARC embodiments are listed below but it should be noted that the VARC 101 can exist in a wide range of incarnations. The following exemplary combinations of motion and tactile configurations, audio and visual configurations and control configurations can be result several VARC embodiments:

Video display with handheld remote control system,
FPV Goggles with handheld remote control system,
FPV Goggles with more realistic integrated seat and control systems,
FPV Goggles with virtual chair that provides motion and control systems,
FPV Goggles with virtual chair, full motion and control system tactile force feedback, and
High definition, wrap around display in fully enclosed cockpit with full motion and cockpit and control system tactile force feedback. This VARC embodiment is a cockpit/capsule (pod) that the pilot steps into and that closes completely around the pilot to provide a sound proof and light proof immersed environment.

The multiple VARCs 101 and RDP/RDCP 106 can interface with a single UV 102. While only one 'primary' RDP can give control commands at any given time, an unlimited number of RDCPs can interface as 'secondary' users. These RDPs may have control of the field of view presented in their VARC, comparable to a passenger in a regular vehicle looking out different windows. UV control may also be passed from the 'primary' RDP to a 'secondary'. RDPs can also switch between interfacing with different UV platforms in a single VARC.

FIG. 7 illustrates exemplary VARC 101 architecture for use with embodiments of the system. Each VARC #N 101 has two main elements: VARC-Centric Signal Transmission, Receiving and VARC Onboard Processing Systems (VOP) 201 and Controls and Interface Systems 223. Systems for delivering augmented content to the user, or RDP/RDCP 106 include Tactile and Motion Feedback systems 601, Visual Systems 602 and Audio Systems 603. Motion systems within the Tactile and Motion Feedback 601 include the mechanical, electrical, and software systems that receive the pilot control input information and real-world-environment sensor data and translate the motion of the cockpit to simulate the real-world UV 102 motion.

Visual systems 602 are the means by which a user views real world images from the UV 101 and overlaid visual augmented content.

Audio systems 603 are the means by which a user views hear audio files and real time audio from the UV 102 location or communicate with other pilots, including the Control Pilot 104.

UV 102 control by the RDP or RDCP 106 are performed using specialized and personalized Control Systems 604. This includes Motion Control Systems 605 for vehicle motion control, Environmental Interface Systems 606 specific to the PARDE mission at hand, Payload Control Systems 607, Gaming Systems 608 controls and Sensors 609. VARC sensors may include gyroscopes, power sensors, temperature sensors, etc. Pilots may control UV 102 Payload Control Systems 607 through standard joysticks, buttons, etc. but may using head motion tracking systems (e.g., camera views may be controlled through head motion to simulate real-time environment viewing).

Also shown on FIG. 7 is exemplary architecture for personalization of RDP or RDCP Settings 702. Settings can be set in advance or just prior to a PARDE event. They can be accessed and set via a user Web Portal 701 or other means. Settings for personalization to the RDP or RDCP 106 include: Language 703, Skill Level 704, Augmented Reality (AR) Content Preferences 705, and Additional Settings 706 as needed. An example of personalized audio AR content delivery can as simple as having the RDP or RDCP 106 enter their preferred genre of music to be played in the background during a flight. Visual AR content personalization could include wanting to have access to retrieve specific topical information about a location during PARDE. As for tactile and motion feedback related AR, the user may prefer a jarring experience while others may prefer a smooth and calming ride in the VARC.

Depending on the embodiment, the VARC-Centric Signal Transmission, Receiving and VARC Onboard Processing Systems 201 may be installed or integral to the Motion Chairs 610 or 3D Motion Chair Pods 611, VR Goggles 616, Headset and Microphones 618, or any of the VARC Control System Components 604. A VARC Onboard Processor (VP) #p will process the data and signals from the OCS 103 via Receiver 221 and to the OCS 103 via a Transmitter 222.

Basic functionality of the VARC 101 is presented in Table 2.

TABLE 2

Functionality of VARC 101

| Functional Category | VARC 101 Related Architecture, Functionality and System Responses |
|---|---|
| RDP, RDCP 106 and CP 104 Communications | Supports Audible and Visual communication Systems (602 and 603) to provide the ability to communicate with one or more pilots operating in the PARDE and provides ability to switch on one on one communication or to communicate with multiple or groups of pilots at a time. Visual communication may include a picture in picture view of the individual(s) the CP is communicating with. |
| OCS 103 Monitoring of VARC 101 | Visual Systems 602 and Sensors 609 allow OCS 103 and CP 104 to monitor VARC #N 101 status. |
| RDP and RDCP 106 Monitoring | Visual Systems 602 and Sensors 609 allow OCS 103 and CP 104 to monitor RDP or RDCP 106. |
| OCS 103 Override Control of UV 102 | Interruption of RDP and RDCP 106 control while OCS 103 is controlling the UV 102. |
| CP 104 Override Control of UV 102 | Interruption of RDP and RDCP 106 control while CP 104 is controlling the UV 102. |
| CP 104 Semi-direct Override control of UV 102 | Allows for partial or dual control between OCS 103 or CP 106 and RDP 104 using the VARC 101. |
| Fail-Safe Shut Down | VARC 101 control terminated and controlled VARC shut down occurs. |
| SWARM, Flock or Autonomous Clustering Setting from OCS 103 to UVs 102 | Interruption in RDP 106 control while OCS 103 or CP 104 are controlling the UV in this settings. RDP 106 may retain some control of the UV even in the SWARM mode. The CP 106 may set the direction or path the flock must take while the individual RDP 106 fly or traverse about with limitations. The entire flock will move in the direction, altitude, etc. determined by the OCs 103 or CP 104, similar to bird murmuration. |
| Software/Operating System | Integrated with VARC 101, OCS 103 and UV 102 and enables interoperability for all defined features and functions. |
| Web Portal 701 for RDP and RDCP 106 Access and Profile Configuration | OCS 103 may have a Web Portal 701 to access RDP 106 information and perhaps auto configuration of pilot settings based on RDP or RDCP profiles. |
| UV 102 Identification | Unique identifiers used to pair VARC 101 to UV 102. |
| UV 102 Onboard Payload and Support Systems (OPSS) 408 | Paired with VARC 101 Payload Control Systems 607, Gaming Systems 608 and Environmental Interface Systems 606. Control system to manage the IR beams and targeting systems. Impacts to control responsiveness based on simulated damage programmed for the 'hits' that have occurred. Measured hits impact to control systems may be displayed as part of OSD telemetry. |
| UV 102 Lighting Systems | Provides illumination of environment as needed. Gives visual indication of status of other UVs operating within the PARDE. Lighting Systems status to be controlled by Environmental Interface Systems 606. |
| UV Sensors 207 and Wireless Communications 107 | VARC 101 receives and responds to telemetry data information through Transmitters 222 and Receivers 221 transmitting the signals to/from Controls and Interface Systems 223. |
| UV 102 First Person View (FPV) video systems (Drone's Eye View) | Combine virtual reality (VR) head mounted displays (HMDs) with (UV) technology to RDP 106 or control payload on a UV 102 through a VR Goggles 616, computer screen or tablet 617. A UV 102 mounted with cameras which streams video to a VR headset, or equal. Control the flight of a UV through its remote controller, while the RDP at the same time is being shown the flight through an immersive video medium. The RDP 106 also has the choice to look around due to the camera platform being synchronized with the head tracking sensors in the HMD. The camera (Optical Sensors 402) is mounted to a platform Onboard Payload and Support Systems 408. The servo positions on the camera mounts can be synchronized to HMD orientation by extracting the vector components which in sum represent the direction the HMD is pointing. The direction coordinates produced in the headset are converted into a range which will be used to steer the servos. The coordinates are modified to be contained within a specific range, which is dictated by the rotational reach of the servos. The modified coordinates can then be sent by serial wireless transmission (transmitters 208) or equivalent. The cameras (Optical Sensors 402) mounted on the UV will transmit video to the OCS 103 and ultimately to the VARC 101 and VARC Visual Systems 602. Composite video must be converted to digital format in order |

TABLE 2-continued

Functionality of VARC 101

| Functional Category | VARC 101 Related Architecture, Functionality and System Responses |
|---|---|
| | to be able to process the video stream. This conversion can be done by an external composite to USB device. The video stream is then subjected to real time manipulation, which serves the purpose of distorting the images into a format which can be viewed in the head mounted display. Include multiple camera and video systems via Optical Sensors 402 and stabilization systems (e.g., brushless gimbal or equal) as part of Onboard Payload and Support Systems 409. A RDP and multiple RDCP may access and view differing parts of the captured real-time video. Video may be HD70p, HD 1080p, NTSC or better including composite of 3840-by-3840 pixel photographs. |
| Create PARDE "Library" with Spatial Data, Site Settings and Preferences 215 and Augmented Content Data and Settings 216 | PARDE Template parameters set once PARDE selected. Parameters specific to the VARC 101 for the particular party will be processed in the VARC Onboard Processor #p 202. |
| Creation of PARDE Template PARDE Type Setting | Sensor 207 and GPS 206 data delivered to VARC 101 via OCS 103 for use in UVs 102. Augmented content and configuration from OCS 103. PARDEs can be categorized into "Types" of PARDEs such as educational, recreational, health and wellness and other. Each PARDE type may have its own VARC 101 centric settings and constraints. |
| Unmanned Vehicle (UV) 102 Type | Each event will have UVs uniquely identified in the OCS 103. There will be a unique code associated to each UV that represent type of UV land, air, surface water, or submersible UV Type and specific to the individual UV. Unmanned Aerial Vehicles (UAV) 301 may be Multi-rotor Aerial Vehicles 305, Fixed Wing 306, or Aerial Animal Based Robotic Vehicles 307. Unmanned Ground Based Vehicles 302 may be Track Mounted Ground Vehicles 308, Wheel Based Ground Vehicles 309 (e.g., street race cars, off-road trucks, buggy, trucks, or "monster" trucks), Multi-pod Vehicles 310 or Humanoid Robotic Vehicles 311. Unmanned Surface Water Vehicles 303 can include Fixed Hull or Inflatable Hull Surface Water Vehicles 312. Unmanned Underwater Vehicles 304 can include Fixed Shell Underwater Vehicles 313 or Underwater Animal Based Robotic Vehicles 314. Control systems are configurable to the assigned UV 102 Type set by OCS 103 and CP 104. Configuration may be manual or automatic based on VARC to UV Pairing. |
| VARC 101 to RDP and/or RDCP 106 Profile Pairing | Can be pre-set or configured real-time. Sets the rules and protocols for how the UV 102 responds to RDP and/or RDCP controls according to configuration settings. Auto configuration of all configurable parameters set and defined with the assigned RDP 106. |
| VARC 101 to UV 102 Pairing | Can be pre-set or configured real-time. Sets the rules and protocols for how the UV 102 responds to VARC 101 controls according to configuration settings. Paired to a UV 102 for control based on paired RDP 106 Profile. |
| Multiple VARC 101 to UV 102 Daisy Chain | Multiple VARCs 101 respond both for tactile and motion simulation but for field of view and augmented content delivery. Daisy chains according to paired VARC 101 and associated control Type configured (autonomous or semi-autonomous) |
| UV 102 and VARC 101 Control Type and Motion Control Systems 605 | Control type and Motion Control Systems 605 based in part on mode of autonomous vehicle (i.e., air, ground, surface or underwater). VARC 101 Control type and Motion Control Systems including yolks, steering wells, buttons, pedals, throttles, brakes. Responds according to configured pairing of VARC and associated Control Type. Systems can be configured directly or through use of the OCS 103. May include commercially available manufactured parts such as electronic speed control (ESC) motors. VARC Control System configuration can be set based on Control Type as follows: Passenger - video, tactile, and motion experience with optional full video control. Payload - control other type of Payloads such as targeting for IR tag games. Pilot - full pilot control based on associated Pilot Profile settings |
| RDP and RDCP 106 VARC 101 Control Layout Configurability | VARC 101 accepts configuration once RDP and RDCP 106 Profile pairing is complete. |
| RDP and RDCP 106 Profile Settings 702 | Settings can be preset or changed in real time to align with the preferences of the RDP and RDCP 106 so far as they are approved by the CP 104 and consistent with safety and communication protocols. RDP and RDCP Settings 702 include: Language preferences 703, Skill Level 704, Augmented Reality (AR) Content Preferences 705 and Additional Settings 706. The UV 102 paired with the RDP 106 will be respond based on RDP and RDCP 106 Profile Settings 702. Control settings and configuration can |

TABLE 2-continued

Functionality of VARC 101

| Functional Category | VARC 101 Related Architecture, Functionality and System Responses |
|---|---|
| | occur through the OCS 103.<br>1404 is a visual representation of the differing levels of control of UVs available to RDPs based on individual skill level. This level may be assessed before an RDP's first PARDE experience, then loaded or modified as appropriate for future PARDEs. As shown in FIG. 14, the higher the RDPs skill level the more vehicular control is granted.<br>Beginner level RDPs may only have interactive access to the field of view presented to them, so a novices PARDE experience may be similar in some ways to a rollercoaster which does not give any control to passengers. Intermediate skill level RDPs may have access to 3D maneuvering within the Universal Geofence, subject to maximum throttle/acceleration and velocity restrictions. Expert level RDPs may have full control of the vehicle.<br>All levels of skill are subject to both universal and personal Geofences, and accompanying OCS safety overrides. Adjusts based on input parameter changes. |
| Pilot control sensitivity configurability | Accepts configuration settings based on Pilot Profile paired and any adjustments by CP 104. Responds based on VARC configuration changes. |
| VARC Six Degrees of Motion Intensity configurability | Sends motion characteristic sensor data to simulate UV 102 motion at VARC 101. |
| VARC tactile force feedback intensity configuration | Sends system orientation sensor data to simulate VARC and control system tactile feedback. |
| PARDE Universal Geofence 1501 and Personal Geofence Areas 1502 | If piloting towards or near Geofence then there is visual and/or audible warnings. If the RDP does not correct the course, there will be a short interruption in control while the UV 102 Onboard Processing Systems (OPS) 210 engage and re-directs itself. |
| Fail Safe Configuration of the UV 102 for Loss of UV Receiver, GPS or Both | UV on-board GPS 206 optimally provides vehicle localization. In cases of GPS signal loss, the Onboard Processor 212 redundantly provides vehicle localization based on visual processing algorithms. In case of command signal loss the autopilot will return the vehicle to its origin point, if GPS signal is also lost it will do the same based off the onboard processor visual processing. |
| PARDE Configuration Validation | For systems' check to ensure all required configuration settings are input prior to operation in a PARDE event. Primarily an OCS 103 function with VARC 101 compatibility and configuration checks. |
| PARDE Duration Configuration | Flight time information is displayed to RDP VARC Visual Systems 602 display as event telemetry. |
| PARDE's Over | Interrupts and suspends VARC 101 control and the UV 102 returns to "home-base" or preapproved safe landing or staging area. Can be programed through OCS 103, Autopilot 211 or Onboard processor (OP) 212. |
| Configuration of Augmented Audio content. | Augmented Audio Content can be programmed into the OCS 103 for delivery to either the UV 102 (for example in bird "call-back" surveys) or to the VARC 101. Audio can be stored files or real-time from microphones installed in the Onboard Payload and Support Systems 408. Audio can be configured to play at specific GPS locals, at timed intervals or at the retrieval preference of the RDP or RDCP 106. Augmented audio content is delivered to the RDP or RDCP via the Audio Systems 603. |
| Configuration of Augmented Visual Content | Augmented Visual Content can be programmed into the OCS 103 for delivery to either the UV 102 or to the VARC 101. Visual content can be stored video, graphical or hologram files or animation overlaid real-time video from cameras installed on the UV 102 Optical Sensors 402 or the Onboard Payload and Support Systems 408. Visual content can be configured to play at specific GPS locals, at timed intervals or at the retrieval preference of the RDP or RDCP 106. 3D maps and rules will be loaded into the system specific to each PARDE. Augmented visual content is delivered to the RDP or RDCP via the Visual Systems 602. |
| CP 104 Displays and Graphical Generator | Includes Receiving 506 data from VARC Sensors 609 via the VP #p 202 and Transmitter 222 and generating onscreen display for the CP 531 Interface.<br>OCS 103 based system components provide superimposed augmented content over UV 102 real-time, real-world FPV to RDP or RDCP 106. Includes enhanced display system in the full embodiment that provides fully immersive and life-like experience to the RDP. |
| Delivery of Augmented Audio content to RDP or RDCP 106 or to CP 104 | Augmented Audio Content is heard by the RDP and RDCP 106 through the Audio Systems 603 on the VARC 101 and by the CP 104 through the OCS 103 CP Interface 531 Audio Speakers 529. |
| Display of Augmented Visual content to RDP or | Augmented Visual Content is seen by the RDP and RDCP 106 through the Visual Systems 602 on the VARC 101 and by the CP 104 through the OCS 103 CP Interface 531 Monitor 528. |

TABLE 2-continued

Functionality of VARC 101

| Functional Category | VARC 101 Related Architecture, Functionality and System Responses |
|---|---|
| RDCP 106 or to CP 104 | |
| RDP 106 Control Systems 604 | Controls systems on UV 102 operated from VARC 101 Control Systems 604. Systems include Motion Control Systems 605, Environmental Interface Systems 606, Payload Control Systems 607, Gaming Systems 608 and Sensors 609. UV 102 responds to RDP control inputs in real-time through approved RDP Commands or Override Commands 209. |
| VARC 101 Motion Feedback | Sensors 207 and GPS 206 data for real-time position, orientation and motion changes will be directed through the OCS 103 to the VARC 101 Tactile and Motion Feedback 601 systems. Motion can be delivered in this system to the VARC Motion Chairs 610 or 3D Motion Chair Pod 611 using electro-mechanical or pneumatic systems, motors, gears and servos. The degree of motion and its sensitivity to UV 102 movement is configurable. Motion can be translational or rotational or a combination of the two. Motion directional feedback to include yaw, pitch, roll, up, down, left, right and/or forward.<br>Includes the mechanical, electrical, and software systems that receive the pilot control input information and real-world-environment sensor data and translate to motion of the cockpit to simulate the real-world UV motion. Also includes the physical construction and associated design of the cockpit frame which allows for full degrees of motion and acceleration in any given direction. |
| VARC 101 Tactile Feedback | Sensors 207 and GPS 206 data for real-time position, orientation and motion changes will be directed through the OCS 103 to the VARC 101 Tactile and Motion Feedback 601 systems. Tactile feedback including Olfactory Inputs 612, Moisture Inputs 613 or Heat and Air Inputs 614 can be delivered in this system to the VAR using spray nozzles, heaters, air conditioning units and "perfumes". The amount of feedback and their sensitivity to UV 102 movement and location is configurable. |
| Decentralized Deployment of UVs 102 and VARCs 101 | UVs 102 can operate as expected regardless of VARC 101 locations. All movement is controlled and supervised using the OCS 103 and CP 104. UVs 102 and VARCs 101 may be deployed at the same local 105. |

Operational Control System (OCS) 103

The Operational Control System 103 includes Control Pilot Interface 531 systems and components 509-520 that make up the computer system(s) associated to the OCS. The CP Interface 531 includes sub-components that allow the CP to interface with the computer system and control the RDE Operating System Software 901 for PARDE development and execution and PARDE launch time. The OCS includes local CPU(s) 510 for pre-PARDE development as well as during PARDE modifications of settings as and if needed. The OCS is connected to the internet 530 and additional local or regional CPU nodes 203 may be available for additional processing power as needed for execution of PARDE and delivery of augmented content to RDPs in their associated VARCs 101.

System components and descriptions associated with the OCS 103 include: OCS Control and Monitoring Systems 218, Transmitters 219, Receivers 220 and Local or Regional OCS-CPU Nodes #n 203. Sub-components of the OCS Control and Monitoring Systems 218 include CP Interface 531, Address and Data BUS 509, Local OCS-CPU 510, Disk Controllers 511, Graphic Cards 512, Sound Cards 513, Network Cards 514, I/O Ports 515, Modems 516, Mass Memory 517, ROM 518, RAM 519 and Clock 520.

CP Interface 531 can be for one CP 104 or a network of CPs as necessary. CP Interface 531 systems include: Keyboard 521, Printer 522, Mouse 523, Pen/Tablet Display Input devices 524, Memory Sticks 525, Hard Drive 526, DVD/CD drives 527, Monitors 528, Audio Speakers 529 and Internet 530.

The OCS draws from data PARDE Configuration Settings 214 and communicates either directly or through the CP 106 with regulatory, public relations, safety or information sources and entities through the External Communication Systems 217.

Either the Onboard Processing Systems 210 or OCS 103 may provide flight data, PARDE mission plan information, UV 102 condition, and system status to external and local services such as police, emergency crews, regulatory, public relations and local FAA. Communication of this information is facility through the External Communications 217 systems. The OCS 103 or CP 104 may allow programming or real-time entry of new instructions to modify the pre-defined operational PARDE mission plans sent from the OCS.

A PARDE mission plan may include multiple waypoints or destinations during the PARDE mission plan. A UV 102 may experience difficulties, which makes necessary the ability for the UV 102 to receive real-time instructions given to facilitate an efficient and effective management of system conditions such as battery level and heat. Additionally, there may be a desire to modify the PARDE mission plan due to other factors such as environment conditions, CP or RDP preferences. To ensure compliance with operation PARDE mission plans, the OCS 103 may continuously monitor the UV's 102 current pose, speed, and acceleration. The OCS 103 to interface with more than one VARC at a time.

OCS Embodiments

The OCS will have embodiments in the areas of:

1. Safety Communications and Systems—communication system(s) with required frequencies to connect to local and regional regulatory, public relations, and safety facilities. CP interface systems may include various types and forms of microphones and audio devices including table mounted, headsets, or other commercially available components.

2. Pilot Communications and Systems—communication system(s) with variability in frequencies and internet connectivity to connect and communicate with local, regional, national, or global RDPs and associated VARCs and the associated Control Pilot running the PARDE. RDP and CP interface systems may include various types and forms of microphones and audio devices including table mounted, headsets, or other commercially available components.
3. Monitoring Station and Systems—May include one or multiple local or regionally connected computer systems which may be portable, desktop, server, or micro-computer systems. The monitoring system may include one or more monitors to support visual monitoring for safety of pilots and UV activity. CPs may view one, multiple, or all active RDPs and UVs via the multi-monitor system and control of current view(s) for CP monitoring is managed through the RDE Operating System.

Basic functionality of the OCS 103 is presented in Table 3. Functions are supported through the PARDE Operating System Software and executed by the CP via the OCS 103 systems as indicated below.

TABLE 3

Functionality of OCS 103

| Functional Category | OCS 103 Related Architecture Functionality and System Responses |
|---|---|
| External Communications 217 | Supports bi-directional External Communication Systems 217 to provide the ability to communicate with, and receive information from, FAA, regulators, and local officials (e.g., police, fire & rescue, etc.) based on regulations and town/community requirements and for pre, during, and post PARDE communication. |
| RDP, RDCP 106 and CP 104 Communications to/from real environment of UV 102 | Supported through the CP Interface 531 systems including the Monitor 528, Audio Speakers 529, and Microphone 531. The Pilot Communication system supports audible and optional visual communication systems to provide the ability to communicate with one or more pilots operating in the PARDE and provides ability to switch on one on one communication or to communicate with multiple or groups of pilots at a time. Visual communication includes a picture in picture view of the individual(s) the CP is communicating with. |
| OCS 103 Monitoring of UV 102 and VARC 101 | Supported through CP Interface 531 system components and provides the ability of OCS CP to monitor any and all UVs operating within the PARDE. This includes the ability to toggle through 1) a bird's eye view of the location of all UV within the PARDE geo-grid, 2) a direct FPV from any one of the UV within the PARDE, and 3) picture in picture of UV FPV and RDP Monitor. |
| RDP/RDCP 106 Monitoring | Supported through CP Interface 531 system components and provides the ability of the OCS CP to visually monitor all pilots operating within their VARCs at any time. |
| OCS 103 Override Control of UV 102 | Ability of OCS CP 104 to take control of one, multiple, or all UVs, of any type, in the PARDE and to program those UVs to complete specific tasks. Override control may be Direct or Semi-Direct control. Examples include overall control of one or more UV to 1) manually control each or all UV, or 2) configure to travel to specific way points within the PARDE geo-fenced area. The UV control by the CP is managed through a VARC embodiment. Switching of which one, multiple, or all UVs are being controlled is managed through CP Interface systems 531. |
| CP 104 Override Control of UV 102 | CP Interface 531 systems allows OCS to take full override control over one or more UVs |
| CP 104 Semi-direct Override control of UV 102 | CP Interface 531 systems allows OCS to take dual override control for minimal pilot adjustment |
| Fail-Safe Shut Down of UV 102 | CP Interface 531 system allows ability of OCS CP to take control of one or more UV(s) and shut down RDP control and VARC activity and return the UV(s) to pre-defined home base within the PARDE area. |
| SWARM, Flock or Autonomous Clustering Setting from OCS 103 to UVs 102 | CP Interface 531 system allows ability of OCS CP 104 to turn SWARM setting on and off for 2 or more UVs operating in the pilot. Allows override control of 2 or more UVs. |
| Software & Operating System for VARC 101, UV 102, and OCS 103 Communication and Integration | Integrated with VARC 101 and UV 102 and enables interoperability for all defined features and functions. |
| Web Portal 701 for RDP and RDCP 106 Access and Profile Configuration | Auto configuration of pilot settings based on pilot profile. RDPs 106 configure pilot profile settings through the on-line web portal. This configure is stored for all future reference during PARDE mission plan execution. |
| UV 102 Identification | Each UV 102 is registered based on a unique UV ID. OCS configurations are assigned to a UV via this ID. |
| UV 102 Onboard Payload and Support Systems (OPSS) 408 | Onboard Payload and Support Systems (OPSS) include Environmental Interface Systems 411 and Gaming systems 412. Environmental Interface Systems can include speakers, lights, robotic sensors, chemical sensors, manipulators, etc. They will be PARDE specific and closely integrated with the PARDE augmented content delivery. |

TABLE 3-continued

Functionality of OCS 103

| Functional Category | OCS 103 Related Architecture Functionality and System Responses |
| --- | --- |
| UV 102 Lighting Systems | Provides illumination of environment as needed. Gives visual indication of status of other UV operating within the PARDE. Lighting Systems status to be controlled by environmental interface systems 606. |
| UV Sensors 207 and Wireless Communications 107 | Receives and responds to telemetry data information through on-screen display and VARC motion and force-feedback responses. |
| UV 102 First Person View (FPV) video systems (Drone's Eye View) | UV 102 video components provide video feed to OCS monitoring systems associated to CP interface 531 components. |
| Create PARDE "Library" with Spatial Data, Site Settings and Preferences 215 and Augmented Content Data and Settings 216 | As PARDEs are designed and created, they can be saved for future use and fast setup of PARDEs. PARDEs are configured via OCS CP interface 531 systems and stored in PARDE Data and Settings 214. |
| Creation of PARDE Templates | Configured through RDE Operating System via CP Interface 531 systems and stored in PARDE Data and Settings 214. Design/development of PARDE Templates such as Gaming PARDE and Extreme Sport PARDE telemetry templates. Ability to display all PARDE RDP participants, associated individual and team scores, distance from other RDPs during race or game events. For racing type events ability to display pole position of participants and distance from one another |
| Unmanned Vehicle (UV) 102 Type | Configured through RDE Operating System via CP interface 531 systems and stored in PARDE Data and Settings 214. Ability to set PARDE Type templates, which allow for global PARDE settings to a specific TYPE of PARDE. This allows for PARDE types to be created by market segments for Touring, Educational, Gaming, Extreme Sports, and Wellness PARDEs. Once a template is applied then all other PARDE configuration parameters may be set. |
| Unmanned Vehicle (UV) 102 Type | Configured through RDE Operating System via CP Interface 531 systems and stored in PARDE Data and Settings 214. Either a configuration setting for each UV configured within the PARDE, or is automatically set through UV type recognition during VARC to UV Pairing. |
| #M of UV in a PARDE | Configured through RDE Operating System via CP Interface 531 systems and stored in PARDE Data and Settings 214. Ability to configure number of UVs to be controlled within the PARDE |
| UV 102 to PARDE Association | Configured through RDE Operating System via CP Interface 531 systems and stored in PARDE Data and Settings 214. Ability to associate unique UV to be controlled within the PARDE. This includes definition of the UV Type or auto-recognition of UV Type capability. |
| VARC 101 to RDP and/or RDCP 106 Profile Pairing | Configured through RDE Operating System via CP Interface 531 systems and stored in PARDE Data and Settings 214. The ability to associate pilot profile and associated system settings to unique VARC 101. |
| VARC 101 to UV 102 Pairing | Configured through RDE Operating System via CP Interface 531 systems and stored in PARDE Data and Settings 214. The pairing of VARCs to a UV to enable RDP control of their assigned UV from piloting VARC. The UV association sets control systems appropriately based on UV Type. |
| Multiple VARC 101 to UV 102 Daisy Chain | Configured through RDE Operating System via CP Interface 531 systems and stored in PARDE Data and Settings 214. The ability to associate multiple VARCs to a single UV for multi-person UV piloting and participation. |
| RDP and RDCP 106 Control Type | Configured through RDE Operating System via CP Interface 531 systems and stored in PARDE Data and Settings 214. Ability to define the VARC control system configuration to either pilot, payload, or passenger controls and event participation. |
| RDP and RDCP 106 VARC 101 Control Layout Configurability | Configured through RDE Operating System via CP Interface 531 systems and stored in PARDE Data and Settings 214. This is a pilot profile preference setting. Ability to configure control function layout (e.g., positioning of controls for pitch, yaw, throttle, roll, etc.) within each VARC for each RDP and uniquely by UV type. |
| RDP and RDCP 106 Profile Settings 702 | Supported via the RDE Operating System via the CP interface 531 systems, the OCS allows the CP to override certain pre-set settings (e.g., sensitivity, tactile response, motion). |
| Pilot control sensitivity configurability | Configurability on pilot control sensitivity level. This is a pilot profile preference setting supported in the RDE Operating System and can be changed by the CP through the CP Interface 531 systems. This allows setting based on experience and level of comfort piloting the selected UV. |

TABLE 3-continued

Functionality of OCS 103

| Functional Category | OCS 103 Related Architecture Functionality and System Responses |
| --- | --- |
| VARC Six Degrees of Motion Intensity configurability | This is a pilot profile preference setting in the RDE Operating System and can be modified by the CP via the CP Interface 531 systems and allows adjustment of the six degrees of motion intensity level of the VARC during PARDE events. For safety purposes, a maximum setting is mandatorily set in the pilot's profile. |
| VARC tactile force feedback intensity configuration | This is a pilot profile preference setting in the RDE Operating System and can be modified by the CP via the CP Interface 531 systems and allows adjustment of the tactile force feedback intensity level of the VARC during PARDE events. For safety purposes, a maximum setting is mandatorily set in the pilot's profile. |
| PARDE Universal Geofence 1501 and Personal Geofence Areas 1502 | Supported by the RDE Operating System and configured via CP Interface 531 systems and stored in PARDE Data and Settings 214. Ability to set geo coordinates to create an overall geo-fence that contains all UV configured in the PARDE to operate within the defined geofenced area. |
| Fail Safe Configuration of the UV 102 for Loss of UV Receiver, GPS or Both | Configured through RDE Operating System via CP Interface 531 systems and stored in PARDE Data and Settings 214. Ability to define the fail-safe return home geo-coordinate within the defined geo-fenced space. This is the 'Home Base' position for all UVs if the fail safe function is enabled by the OCS or enabled based on failure in remote control systems. |
| PARDE Configuration Validation | System verification that all appropriate PARDE configuration has been completed prior to PARDE initiations. Examples include: 1) Total number of UV have been defined, 2) all UV to VARC pairing have been completed, 3) VARC control types have been defined (i.e., pilot, payload, or passenger), 4) VARC control configuration, 5) VARC control sensitivity configuration, etc.) |
| PARDE Duration Configuration | Configured through RDE Operating System via CP Interface 531 systems and stored in PARDE Data and Settings 214. The ability of the OCS CP to configure PARDE duration. Flight time information is displayed to CP monitors. |
| "PARDE's Over" or Safe Return Home Configuration of Augmented Audio content. | When PARDE duration time ends the VARC control ends and all UVs return to configured home base location. Configured through RDE operating system via CP interface 531 systems and stored in PARDE data and settings 214. The ability to program audio content to geo-coordinates within the defined space for real-time on-screen view and access as pilots operate their UV within the PARDE. System ensures geo-coordinates are within the pre-defined geo-grid (which must be programmed first). Content may include such things as landmark descriptions, pilot path description, obstacle warnings, 'no man's land' warnings for geo-fence boundaries, and advertisements. |
| Configuration of Augmented Visual/Graphical Content | Configured through RDE operating system via CP interface 531 systems and stored in PARDE data and settings 214. The ability to program visual/graphical content to geo-coordinates within the defined space for real-time on-screen display of those images as pilots operate their UV within the PARDE. System ensures geo-coordinates are within the pre-defined geo-grid (which must be programmed first). Content may include visual indicators (e.g., arrows, stars, lines, opaque highlights across land marks or areas of interest) to highlight particular locations of interest (e.g., land-marks, restricted areas, protected ecological areas) and may include additional pop-up text (for hearing impaired, Educational/STEM based PARDEs), and virtual obstacle course structures, etc. |
| Delivery of Augmented Audio content to RDP or RDCP 106 or to CP 104 | The mechanical, electrical, and software systems that make up the graphical and audio generator and configured information superimposes it over the UV real-time real-world FPV for CP monitor view and RDP view, and interaction. Depending on the type of information it will either be superimposed in the real-world view at pre-defined coordinates or at appropriate corresponding GPS coordinates within the real-world view. UV PARDE based telemetry such as altitude, system status, g-force, orientation, PARDE duration, PARDE time remaining, gaming and extreme sport statistics, and system status may be displayed at pre-defined and constant position within the real-world display. Information specific to a defined real-world location (such as landmark information or topology information) will be presented at the GPS coordinates of that real-world location. Telemetry associated to other UVs operating within the current PARDE will be displayed in association with that UV as it visible in the real-world view. |
| Delivery of Augmented Audio content to RDP or RDCP 106 or to CP 104 | Audio content is displayed through OCS monitor screens as visual icon representation that content exists. Display and audible play is associated to the current position of the associated UV being monitored and controlled by the RDPs within each VARC. As a UV is within a configurable distance to the audible geo-coordinates, the content can automatically play or the RDP can manual select and play the content |

TABLE 3-continued

Functionality of OCS 103

| Functional Category | OCS 103 Related Architecture Functionality and System Responses |
|---|---|
| | (configurable). The OCS CP can watch and listen in as they cycle through monitoring of each VARC/UV pair or they can turn-off the sound. |
| Display of Augmented Visual content to RDP or RDCP 106 or to CP 104 | Visual/graphical content is displayed through OCS monitor screens as pre-configured 3D virtual generated image or figure. Display is associated to the current position of the associated UV being monitored and controlled by the RDPs within each VARC. As a UV is within visual range of the configured geo-coordinates the content will begin to come into view. |
| RDP 106 Control Systems 604 | Controls systems on UV 102 operated from VARC 101 control systems 604. Systems include Motion Control Systems 605, Environmental Interface Systems 606, Payload Control Systems 607, Gaming Systems 608 and Sensors 609. UV 102 responds to RDP control inputs in real-time through approved RDP Commands or Override Commands 209. |
| VARC 101 Motion Feedback | CP can experience from VARC that supports motion capability. |
| VARC 101 Tactile Feedback | CP can experience from VARC that supports Tactile Force Feedback capability. |
| Decentralized Deployment of UVs 102 and VARCs 101 | CP can manage OCS and launch UV from any location where network connection can be established. Servers may be located at PARDE launch location or anywhere geographically as long as standard connectivity is maintained between server(s) and active PARDE participants (e.g., TCP/IP, HTTP, WLAN 802.11a, b, g, n) |

PARDE Operating System Software

A Hierarchic Object-Oriented Design (HOOD) diagram of the OCS 103 PARDE Operating System Software 901 is in FIG. 9. The system is integrated across OCS 103, VARC 101, and UV 102. HOOD diagrams (FIGS. 9 through 13) present example hierarchical decompositions of the design into software units based on identification of objects, classes and operations reflecting problem domain entities and objects related to digital programming entities. The diagrams comprise textual and associated diagrammatic representations allowing formal refinement, automated checking, user customizable documentation generation and target language source code generation.

An Internet Web Portal for user access and pilot profile configuration may be used. The portal is a secure user portal (web and mobile) to support initial setup and configuration by administrative staff and access for profile updates by the users. For RDP and RDCP 106 profiles, the following information may be used: Pilot ID, Demographics (name, address, credit, etc.), Pilot Call Sign, Pilot Secure Logon Information, and Pilot event based content (audio/visual).

Restricted access to the website will include systems management data, information and controls including: Certification Level, Pilot & Control Profile Settings, Autonomy Control Settings (Over Ride Control) (Direct, Semi Direct, and/or Supervised), Direct Control Settings (Control Sensitivity settings) (Beginner, Intermediate, or Expert).

Universal and Personal Geofencing computational aspects will be executed in the OCS 103. A flight or PARDE mission planning software such as QGroundcontrol (or similar) will be loaded and run on the OCS 103.

In general, the PARDE mission planning software receiver end runs on the receiver version on the Autopilot 211. The OCS-Control and Monitoring Systems 218 will subscribe to GPS 206 on UVs 102. GPS will publish data to the OCS. The Autopilot 211 will subscribe to the data that the OCS-Control and Monitoring System 218 processes.

Exemplary Augmented Visual, Audio, Motion and Tactile Content Development and Delivery:

Current AR (augmented reality) technology only uses QR codes and handheld devices to overlay AR content to a real environment (Layar, Apple iPhone application, 2015). Embodiments disclosed herein include delivery of AR content to users who are simultaneously driving, flying or "riding" as RDCP in UVs in a predetermined 3D Environment.

FIG. 8 presents an example of PARDE data and settings 214 architecture. Hierarchic Object-Oriented Design (HOOD) diagrams of the visual and audio data and settings are shown in FIGS. 10 and 11, respectively. A Hierarchic Object-Oriented Design diagram of the motion and tactile content data and settings is shown in FIG. 12. FIG. 8 presents data and settings that may require collecting new data, connecting to existing databases or downloading third party software and data for use in the PARDE whereas FIGS. 10 through 12 show primarily the software object hierarchy, some hardware systems interaction and a general, processes representation on the how software and hardware may interact.

At least two sets of information, setting and services may be used in the PARDE system. They are: Spatial Data, Site Settings and Preferences 215 and Augmented Content Data and Settings 216. All of the information from these are directed to and processed at the OCS 103—specifically the OCS-CPU Node #n 203 and OCS—Control and Monitoring Systems 218. Spatial Data 801 includes Restricted Area and Static 3D Virtual Boundary Input Data 803 and Benchmarks and Significant Locating Features 804. Topographic Mapping 805 can be performed by high resolution surveying in the PARDE area or through $3^{rd}$ party satellite imagery and existing databases. Similarly, Vegetative Mapping 806 can be performed by on-site surveys and/or existing databases. Flora including trees, underbrush, groundcover mapping will be needed for PARDE mission planning and control and for augmented content delivery purposes. Structure and Obstacle Mapping 806 could include buildings, poles, overhead utility lines, breakwaters, moorings, pits, signs, etc. This information will be used for PARDE mission planning and control as may be used to enhance or help deliver augmented content. Changes in topography, vegetation, structures and obstacles can occur over time dating back through recent history or projecting and predicting over time. The system will be developed to include and record these changes for mission control, safety, research and educational purposes. This information will be used to develop a 3D point cloud map and to geo-locate mission control points and augmented reality enhancements delivery.

Specific to UV 102 location components, Benchmarks and Significant Locating Features 804 include GPS Coordinates, Quick Response, Bluetooth Beacons, and Site Monuments 808 that have a unique visual signature and a known or determined 3D location in space (i.e., latitude, longitude and elevation). These can range in size from the 4 $cm^2$ to the size of a building or significant landscape horizon. The system will include options to have Approved Launch and Landing Areas 809 identified and used during PARDEs in the event of an emergency or CP 104 approved command. Launch and landing areas will depend on site specific logistics and structural and landing systems 409 of the UV 102.

Site settings and preferences 802 include Event Category Identification (ID) and Information 810, Site Contact Data and Protocols 811, External Traffic Feed Information 812, Regulatory Requirements 813, Position, Time and Space Restrictions 814, Site Specific Weather Information Feed 815. Adding to the safety and logistics of a PARDE, each of these settings and preferences will be configurable. Event Category ID and Information 810 may include settings for research protocols, educational system content requirements, health and wellness protocols or other market or user group categorization. Site Contact Data and Protocols 811 are easily retrievable and communications protocols for site owners and operators. External Traffic Feed Information 812 may include air traffic, boating and navigational traffic feeds to help PARDE mission planning and ensure obstacle avoidance. Regulatory Requirements 813 will include requirements that may impact a PARDE. For example, allowable flight altitude or local zoning, privacy and noise ordinances might impact planned PARDE execution. Site Specific Position, Time and Space Restrictions 814 not otherwise accounted for and specific to the PARDE location will be used in PARDE mission planning and execution. Examples might be no UV 102 flight next to a school during student drop off and pick up times or restrictions on habitat and natural resources. A Site Specific Weather Information feed will be available for PARDE mission planning and execution and to monitor conditions in and around the PARDE area.

Augmented Reality (AR) content includes 2d and 3d graphics, video, audio, and text files, tactile, motion, olfactory and sensory protocols loaded onto OCS-CPU Node #n 203. AR content can be delivered at specific planer markers or GPS 206 waypoints. Content will be associated to planer markers or GPS waypoints and presented visually through the VARC 101 to the user when associated marker or waypoint is within the user's field of view. AR will be superimposed in the real-world view at pre-defined coordinates, at appropriate corresponding GPS coordinates, at QR codes or at known vector locations within the real-world view. AR content may be directly visible to the RDP or RDCP 106 or CP 104 or accessible to the users through a visual interactive interface. Content can be adjusted in size and proportion in order to look near or far based on distance of UV to marker or waypoint and based on configured size of augmented content within the real world. Visual interactive interfaces may also adjust size and proportion based on distance and RDPs will interact through voice, mechanical, motion, or other means.

Augmented content data and settings 216 include, but are not limited to, the following: Content Category Identification (ID) and Information 816, Tactile Profile 817 data, Olfactory and Sensory Profile 818 data, Animation Databases 819, Multimedia Partner Feeds 820, Site Specific Augmented Reality Content 821, Storyboards 822 and Production Elements 823.

Content Category ID and Information 816 is used to categorize and easily retrieve PARDE AR content from one PARDE to another. Tactile Profile 817 data includes the protocols for delivering a motion feedback pattern to the VARC 101 and RDP and/or RDCP 106. For example, a UGV 302 might feel differently to a user if it were moving over sand and rocks as opposed to asphalt. That tactile difference will be programmed to the VARC 101 through the OCS 103 using these settings. Similarly, Olfactory and Sensory Profile 818 data will include initiating different particular scents perhaps when the UV is passing through a flower patch or pine forest. A USV 303 might participate in a PARDE that travels near a waterfall at which time these settings would initiate a water mist to the user for example. Animation Databases 819 include all the necessary software development to provide animation layered over the FPV of the RDP/RDCP 106 or CP 104. Animation will included polygon structures and skins programmed to move, react, and interact with the real environment via the VARC 101 and OCS 103. Augmented reality visual content and animation can be achieved through proprietary software or open source object recognition library software such as Aruco, for OpenCV. Predetermined GPS coordinates, QR visual aids within a PARDE will be used as anchor points to tie the visual AR content to real environment locations.

Data from optical sensors 402 will be sent to the OCS-CPU Node #n 203 where object recognition software will be run. Distinct and unique non-planar markers will be used for positioning reference, though may be possible to use GPS waypoints as substitutes depending on type of content and needed location accuracy needed. Augmented content can be pushed to or retrieved by the user. The goal is to render AR content to the user at between 27 to 30 frames per second (fps). Augmented content preferences can be configured.

Multimedia partner feeds 820 from $3^{rd}$ party producers such as book, radio and television or internet based publishers (e.g., National Geographic, or The History Channel), will provide content for delivery to the VARCs 102 and users. Site Specific AR Content 821 could be 2D or 3D graphics, video, text or audio content the PARDE location and event needs.

Multi-model, multiuser PARDEs may be choreographed and planned from beginning to end. As such, storyboards 822 and associated production elements 823 (lighting, music, and staging) will be developed and used for re-occurring PARDE themes and topics.

Augmented visual content development and delivery 1001 shown in FIG. 10 have pre-programmed display 1002 features, real time display 1003 features prompted, or initiated by triggers 1004 (e.g., specific GPS coordinate), and site specific display requirements 1005. There are common elements between the pre-programmed display 1002 and real time display 1003 to the VARC 101 through the OCS. They include but are not limited to:

Video,
Animation,
Graphics,
Holograms,
GPS Coordinates,
Speed,

Altitude,
Gaming Scores or Data,
Environmental Interface Data,
Wellness Program Plans of Care and Performance,
Floating Icons, and
Movable Maps.

Site Specific Display Requirements 1005 might be age restricted material, skins and other animated settings, advertising and business-related requirements. Information specific to a defined real-world location (such as landmark information or topology information) will be presented at the GPS coordinates of that real-world location. Telemetry associated to other UVs 102 operating within the current PARDE will be displayed in association with that UVs location as it is visible in the real-world view.

Augmented Audio Content Development and Delivery 1101 shown in FIG. 11 have Pre-programmed Audio 1102 features, Real Time Audio 1103 features prompted and Site Specific Audio Requirements 1104. There are common elements between the Pre-programmed Audio 1102 and Real Time Audio 1103 to the VARC 101 through the OCS. They include but are not limited to:
Audio Files,
GPS Coordinates,
$3^{rd}$ Party Content and Services Site specific audio requirements 1104 might be age restricted material, local audio files, or advertising and business-related requirements. Information specific to a defined real-world location (such as landmark information or topology information) will be presented at the GPS coordinates of that real-world location. Telemetry associated to other UVs 102 operating within the current PARDE will be transmitted in association with that UVs as it is located the real-world view.

Augmented tactile and motion content development and delivery 1201 shown in FIG. 12 have pre-programmed motion and tactile features 1202, real time motion and tactile response 1203 and site specific motion and tactile requirements 1204. There are common elements between the pre-programmed motion and tactile features 1202 and real time motion and tactile response 1203 to the VARC 101 through the OCS. They include but are not limited to:
Motion Signatures and Profiles,
Olfactory Profiles,
Moisture Profiles,
Heat and Air Profiles, and
GPS Coordinates.

Real-Time Motion and Tactile Response 1203 also includes protocols for setting responses to the UV's 102 proximity to the Universal Geofence or its proximity to other UVs. Site Specific Motion and Tactile Requirements 1204 might be age restricted motion, motion signatures profile settings, and advertising and business-related requirements. Motion and tactile feedback specific to a defined real-world location (e.g., cold, moist tunnel) will be presented at the GPS coordinates of that real-world location. Telemetry associated to other UVs 102 operating within the current PARDE will be processed and may impact the VARC 101 motion and/or tactile feedback if another UV enters the Personal Geofence boundary as discussed later.

Exemplary Augmented Environmental Interface and Gaming Content Development and Delivery:

A Hierarchic Object-Oriented Design diagram of the Environmental Interface, Payload Control and Gaming Systems is shown in FIG. 13. Augmented Environmental Interface and Gaming Content Development and Delivery 1301 have Pre-programmed Payload Requirements 1302, Real Time Payload 1303 requirements and Site Specific Payload Requirements 1304. There are common elements between the Pre-programmed Payload Requirements 1302 and Real Time Payload 1303 requirements to the VARC 101 through the OCS. They include but are not limited to Chemical, Physical and Electrical Manipulation Profiles, and GPS Coordinates.

Real-Time Payload 1303 features also includes protocols for setting responses to the UV's 102 proximity to the Universal Geofence or its proximity to other UVs. Site Specific Payload Requirements 1304 might be vibration restrictions, weather conditions, chemical, physical and electrical manipulation profile settings, and advertising and business-related requirements. Payload response specific to a defined real-world location (e.g., environmental parameter measuring instrument such as a photoionization detector) will be presented at the GPS coordinates of that real-world location. Telemetry associated to other UVs 102 operating within the current PARDE will be processed and may impact the VARC 101 payload controls feedback.

PARDE Run Procedures

FIG. 14 shows a generalized Personalized Augmented Reality Drone Event (PARDE) run flowchart. 1404 shows a conceptual representation of the variable control a RDP 106 may be allowed to have by the OCS 103 and CP 104 based upon the pilot's past performance and results of User Skill Level Protocol Assessment 1403. The assessment can occur at any time before the PARDE is started. In-PARDE modifications can be made to the level of control a pilot is given by the CP 104. An Expert in 1404 may be give full attitude control while a less experience RDP, or beginner will only be give a perceived 1-st order control. This would be analogous to riding a roller coaster on rails and have the speed controlled by either the OCS 103 or CP 104.

The Safety and Content Override Command 1412 are flight control related and AR elements of the Approved Remote Drone Pilot (RDP) Command or Override Command 209. Controls and AR content are continually reviewed, assessed, processed and transmitted by the OCS 103 and/or CP 104. As the level of sophistication and programmable protocols are automated in the OCS 103, less direct control and/or supervision by the CP 104 will be needed.

PARDE Universal Geofence

FIG. 15 shows an example PARDE Universal and Personal Geofencing in accordance with the invention. The PARDE Universal Geofence Layout 1501 is developed by defined boundary locations of a 3D space. The PARDE Personal Geofence 1502 is defined as a sphere of radius "x" whereby autonomous behavior of the UVs 102 are initiated to avoid collisions for example. The universal boundaries are defined using Universal Geofence Settings 1503 in Cartesian coordinates (Latitude, Longitude and Elevation). The accuracy of the grid is less than 1 foot depending on the GPS 206 and PARDE Spatial Data 801 and point cloud resolution. The location of Universal Geofence Settings 1503 will be such that a 3D space with contiguous sides can be rendered providing the UVs with an "allowable" space to execute the desired PARDE mission plan. The allowable space will be the 3D Universal Geofence Setting boundaries minus some distance, or buffer zone. FIG. 16 shows a typical Universal Geofence logic flowchart. Autonomous corrective behavior of the UV 102 will be initiated to prevent passing through the geofence boundaries.

UV 102 on-board GPS 206 optimally provides UV 102 localization; in cases of GPS 206 signal loss the onboard processor 212 redundantly provides vehicle localization based on visual processing algorithms. Field located visual Quick Response (QR) codes or equivalent 1504 will be placed in areas of the PARDE visible by the UVs 102. Equivalent visible markers will include some Benchmarks and Significant Locating Features 804. This system of QR Codes, markers and benchmarks is used to create an Outdoor Distributed Image Network (ODIN). The ODIN defines network of images which allows high accuracy localization which is important for motion control and stable transmission and delivery of AR.

UV 102 on-board GPS 206 optimally provides vehicle localization; in cases of GPS signal loss the Onboard Processor 212 redundantly provides vehicle localization based on visual processing algorithms. In case of command signal loss the autopilot will return the vehicle to its origin point, if GPS signal is also lost it will do the same based off the onboard processor visual processing.

FIGS. 17A, 17B and 17C are visual representations of the safety protocols of this claim for various loss of signal scenarios. GPS 206, sensors 207, receiver 205 and the onboard processing systems (OPS) 210 function redundantly to allow for a high degree of certainty with respect to UV 102 location. Loss of Signal 1601 can occur from these systems. When the GPS 206 signal is lost, Sensor 207 visual cues can be used with processing by the OCS 103 for safe return to an approved "home base", landing or staging area for example.

If the loss of signal 1701 is to the receiver 205, GPS 206 and visual cues 1702 together are processed in the OPS 210 to direct a safe return of the UV 102 for example.

If the loss of signal is to both the receiver 205 and GPS 206 system, visual cues 1702 from the sensor 207 could be processed in the OPS 210 to direct a safe return of the UV 102 for example.

PARDE Personal Geofence

The Personal Geofence is a defined 3D sphere around individual UVs which is not allowed to overlap with another UVs individual geofence. Any command by a RDP(s) to bring UVs close enough to violate this rule will result in the OCS 103 overriding their commands and separating the vehicles to an acceptable distance. UV1 and UV#M in the figure show the closest proximity two UVs may be allowed before Override Command 209 prevents a collision.

Example PARDE Components with Augmented Content, Universal and Personal Geofences FIGS. 18A and 18B show examples of conceptual PARDEs for example gaming and eco-touring PARDEs. Both are showing events in to occur in real time in real environments (e.g., school football field, forest and ocean). Multi-model UVs include aerial, ground and underwater vehicles. Both Universal Geofences 1501 and Personal Geofences 1502 are shown. Elements of the ODIN Field Located QR Codes 1504 and Universal Geofence Settings 1503 are shown. Site Specific Augmented Content 821 represented by two AR animated castles is visible through the VARC 101. An example 3D point cloud from Topographic Mapping 805 and Vegetative Mapping 806 are shown.

We claim:

1. A system to control a plurality of unmanned vehicles, comprising:
    an operational control system;
    at least one virtual augmented reality cockpit in two way communication with said control system; and
    a plurality of unmanned vehicles in two way communication with said control system;
    wherein said operational control system sets command parameters for each one of said virtual augmented reality cockpits and said control system sets safety limits for each one of said unmanned vehicles; and
    each one of said virtual augmented reality cockpits has control over one of said unmanned vehicles except that said operational control system over-rides said virtual augmented reality cockpit if either said command parameters or said safety limits are out of preset ranges.

2. The system of claim 1 further including a universal geo-fence that defines a permissible travel three dimensional space for said plurality of unmanned vehicles.

3. The system of claim 2 wherein said operational control system is configured to over-ride said virtual augmented reality cockpit if one of said plurality of unmanned vehicles crosses said universal geo-fence.

4. The system of claim 2 wherein said command parameters are independently set for each one of said virtual augmented reality cockpits.

5. The system of claim 4 wherein said command parameters are based on a pilot profile setting based on pilot experience and are selected from the group consisting of full control, partial control and view-only.

6. The system of claim 5 wherein said partial control is configured to enable said virtual augmented reality cockpit to have maneuverability within said universal geo-fence subject to throttle/acceleration and velocity restrictions.

7. The system of claim 4 wherein said safety limits are selected from the group consisting of weather, battery charge, communication integrity, obstacle avoidance, speed and location.

8. The system of claim 7 wherein said operational control system is configured to over-ride said virtual augmented reality cockpit if said location deviates from said permissible three dimensional defined by said universal geo-fence.

9. The system of claim 8 wherein location is determined by one or more of a global positioning system (GPS), a distributed image network, field located visual quick response (QR) codes and benchmarks.

10. The system of claim 7 wherein said operational control system defines a three dimensional personal geo-fence around each one of said plurality of unmanned vehicles.

11. The system of claim 10 wherein said operational control system is configured to over-ride said virtual augmented reality cockpit if one of said unmanned vehicles encroaches on the personal geo-fence of another of said plurality of unmanned vehicles.

12. The system of claim 11 wherein said operational control system configures said plurality of unmanned vehicles to exhibit swarm behavior.

13. The system of claim 12 wherein said operational control system is configured to toggle between swarm behavior and independent travel.

14. The system of claim 2 wherein said plurality of unmanned vehicles are selected from the group consisting of aerial vehicles, ground vehicles, surface water vehicles, underwater vehicles and combinations thereof.

15. The system of claim 14 wherein at least one of said plurality of unmanned vehicles includes a camera effective to capture a view from said unmanned vehicle and said virtual augmented reality cockpit includes a system effective to display said view.

16. The system of claim 15 wherein said virtual augmented reality cockpit includes one or more of physical, voice and neural control systems responsive to said view.

17. The system of claim 14 wherein said virtual augmented reality cockpit has a range of motion configured to simulate motion of at least one of said plurality of unmanned vehicles.

18. The system of claim 14 wherein said operational control system adds augmented content configured to correspond to said view.

19. The system of claim 18 wherein augmented content is selected from the group consisting of a stored digital file including audio content, interactive real-time up-dates, three dimensional virtual reality and combinations thereof.

20. The system of claim 19 wherein said operational control system is configured to select a desired language for said audio content.

21. The system of claim 19 wherein said virtual augmented reality cockpit has selective control over said augmented content.

* * * * *